United States Patent [19]

Otagawa et al.

[11] Patent Number: 5,187,034
[45] Date of Patent: Feb. 16, 1993

[54] PERMANENTLY DOPED POLYANILINE AND METHOD THEREOF

[75] Inventors: Takaaki Otagawa, Fremont; Marc J. Madou, Palo Alto, both of Calif.

[73] Assignee: Osaka Gas Company Limited, Japan

[21] Appl. No.: 675,091

[22] Filed: Mar. 25, 1991

Related U.S. Application Data

[60] Division of Ser. No. 334,680, Apr. 6, 1989, Pat. No. 5,002,700, and a continuation-in-part of Ser. No. 238,571, Aug. 30, 1988, Pat. No. 4,973,391.

[51] Int. Cl.$^5$ ................. H01M 6/16; H01M 4/60
[52] U.S. Cl. .................... 429/198; 429/213
[58] Field of Search .................. 429/198, 213

[56] References Cited

U.S. PATENT DOCUMENTS 4,869,979 9/1989 Ohtani et al. ............ 429/213

OTHER PUBLICATIONS

Choi et al., "The Chemical and Physical Properties of Electrochemically Prepared Polyaniline P-Toluenesulfonates", J. Phys. Chem. 93 pp. 4659-4664 (1989).

Primary Examiner—John Niebling
Assistant Examiner—Brian M. Bolam
Attorney, Agent, or Firm—Phillips, Moore, Lempio & Finley

[57] ABSTRACT

The present invention relates to an electrically conducting polymer, the water-insoluble polymer having essentially permanent self-doping properties, and the polynmer comprises:
(a) electrically polymerized polyaniline in covalent combination with
(b) an organic dopant having at least one sulfonic acid functional group. The electrically conducting polymer-dopant is preferred wherein the organic dopant is selected from benzenesulfonic acid, toluenesulfonic acid, benzenesulfonyl chloride, dodecylbenzenesulfonic acid, poly(vinylsulfonic) acid, trifluoromethanesulfonic acid, 1-butanesulfonic acid, modified NAFION, 2,3,5-trichlorobenzenesulfonic acid, vinylphenylsulfonic acid, or the alkali metal salts thereof. In another aspect, the present invention discloses a method to produce a water-insoluble polyaniline in which an aromatic organic dopant is covalently bonded to the polyaniline, which method comprises (a) electropolymerizing aniline in an aqueous solvent which contains the organic dopant. These permanently doped polyanilines are useful as films for electric battery electrodes, and for electrochromic applications.

8 Claims, 27 Drawing Sheets

SUBSTRATE : PLATINUM-3D-SILICON OR PLATINUM-3D-POLYIMIDE / CERAMIC

CATHODE (POSITIVE ELECTRODE) : THREE-DIMENSIONAL MICROELECTRODE ARRAY OF SELF-DOPED POLYANILINE

ELECTROLYTE : (SOLID POLYMER ELECTROLYTE, e.g. NAFION, SOAKED WITH ZnSO$_4$)

ANODE (NEGATIVE ELECTRODE) : THREE-DIMENSIONALLY DISPERSED ZINC PARTICLES IN A NAFION FILM

SUBSTRATE : GLASSY CARBON

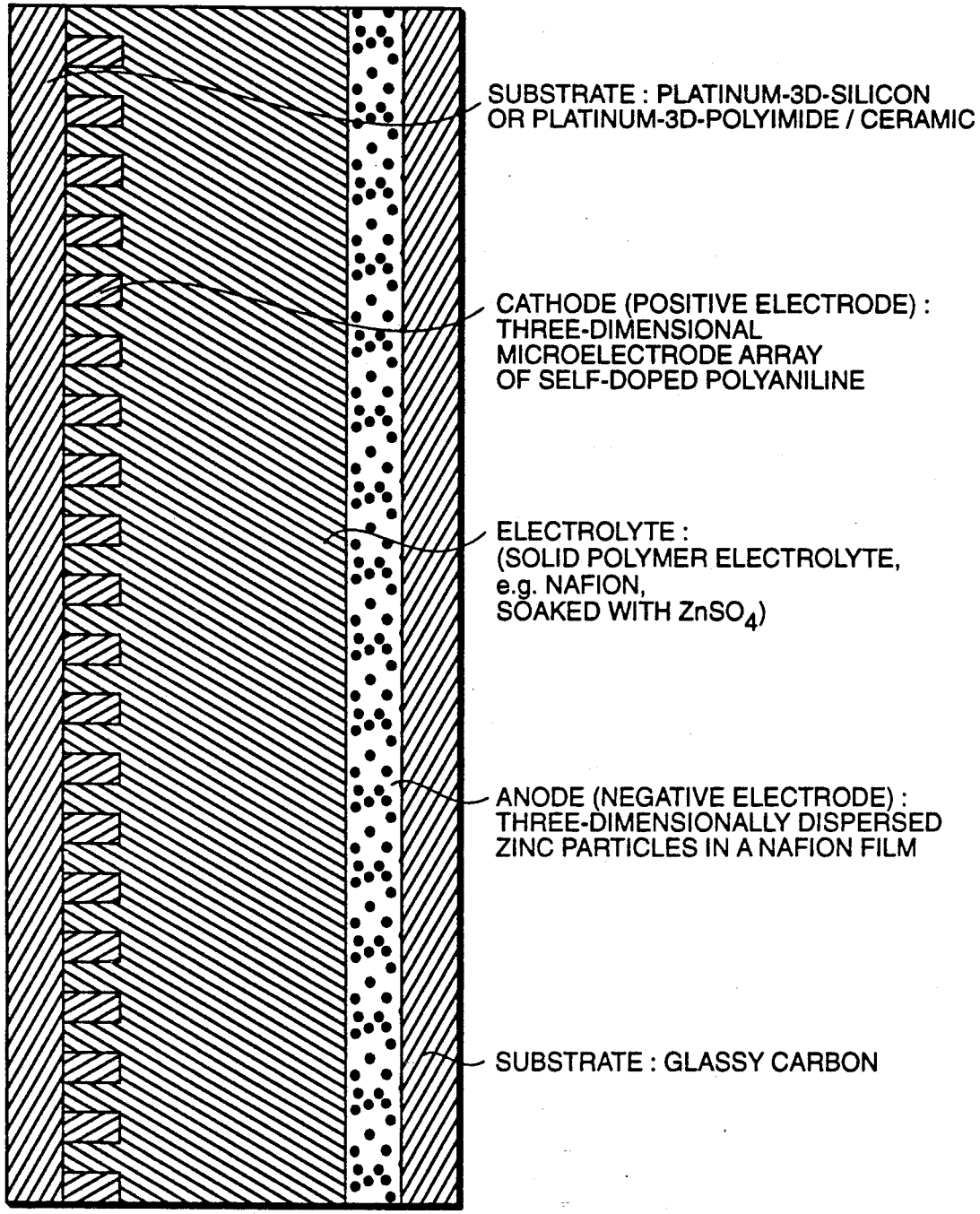
FIG._1

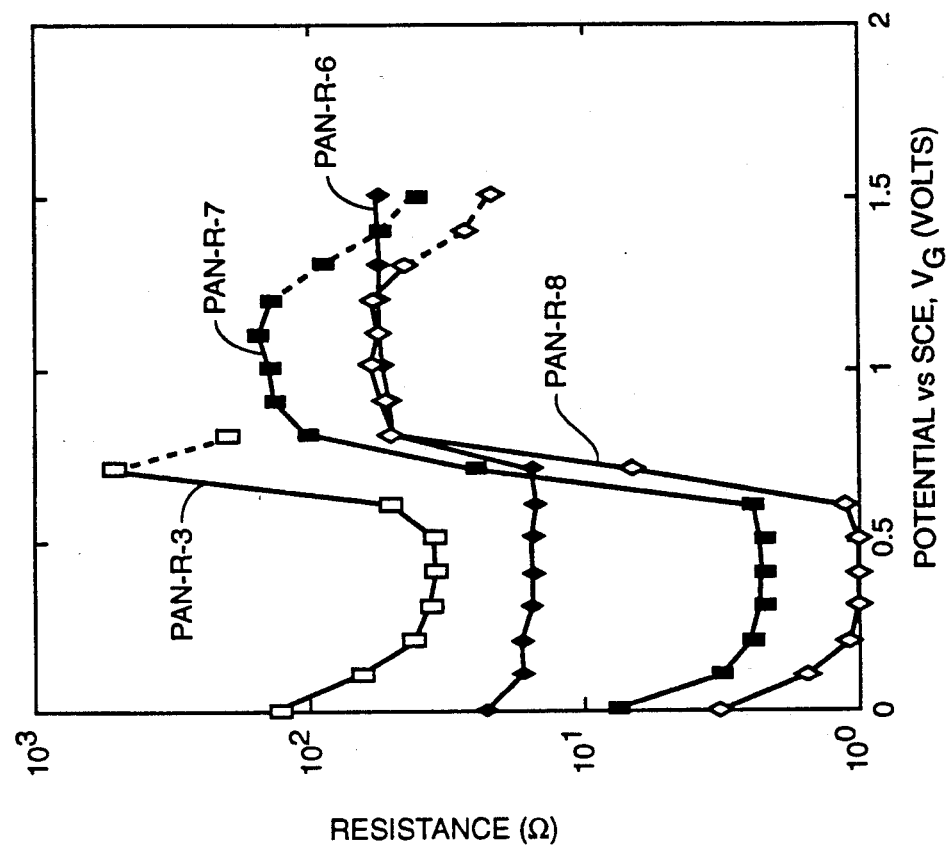
FIG._2B
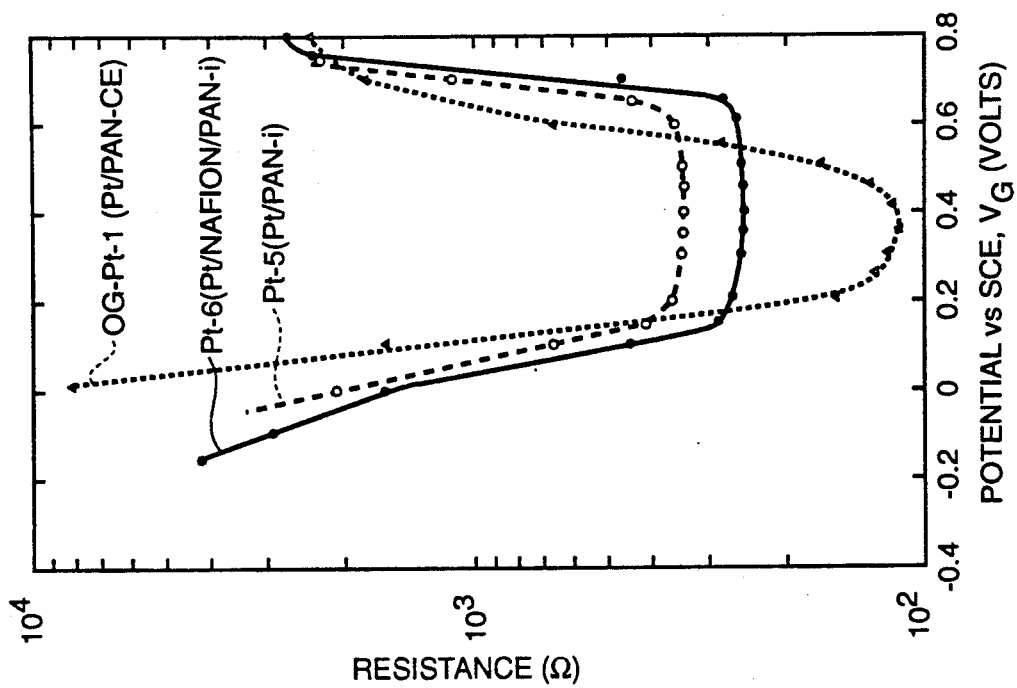
FIG._2A

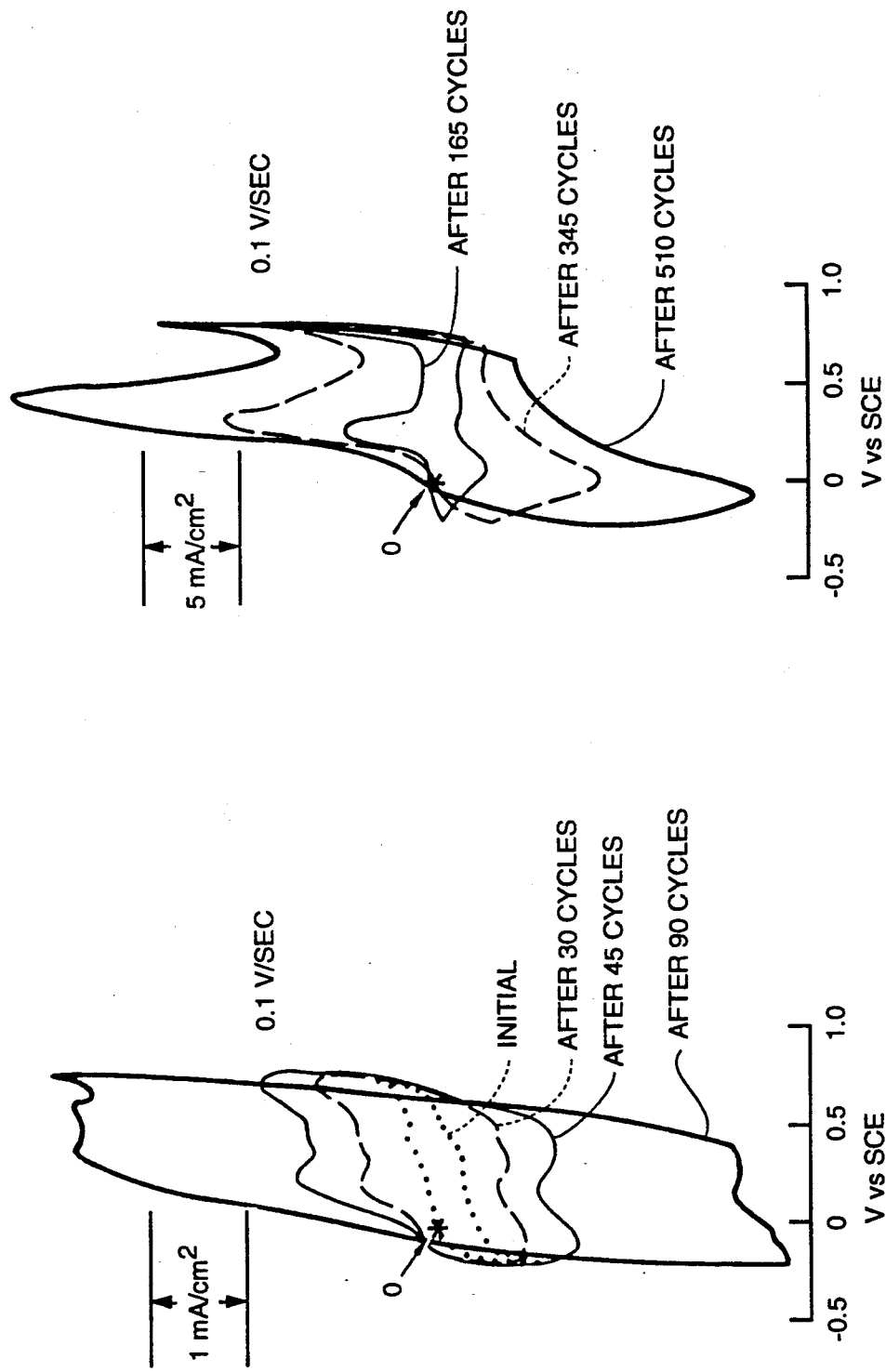

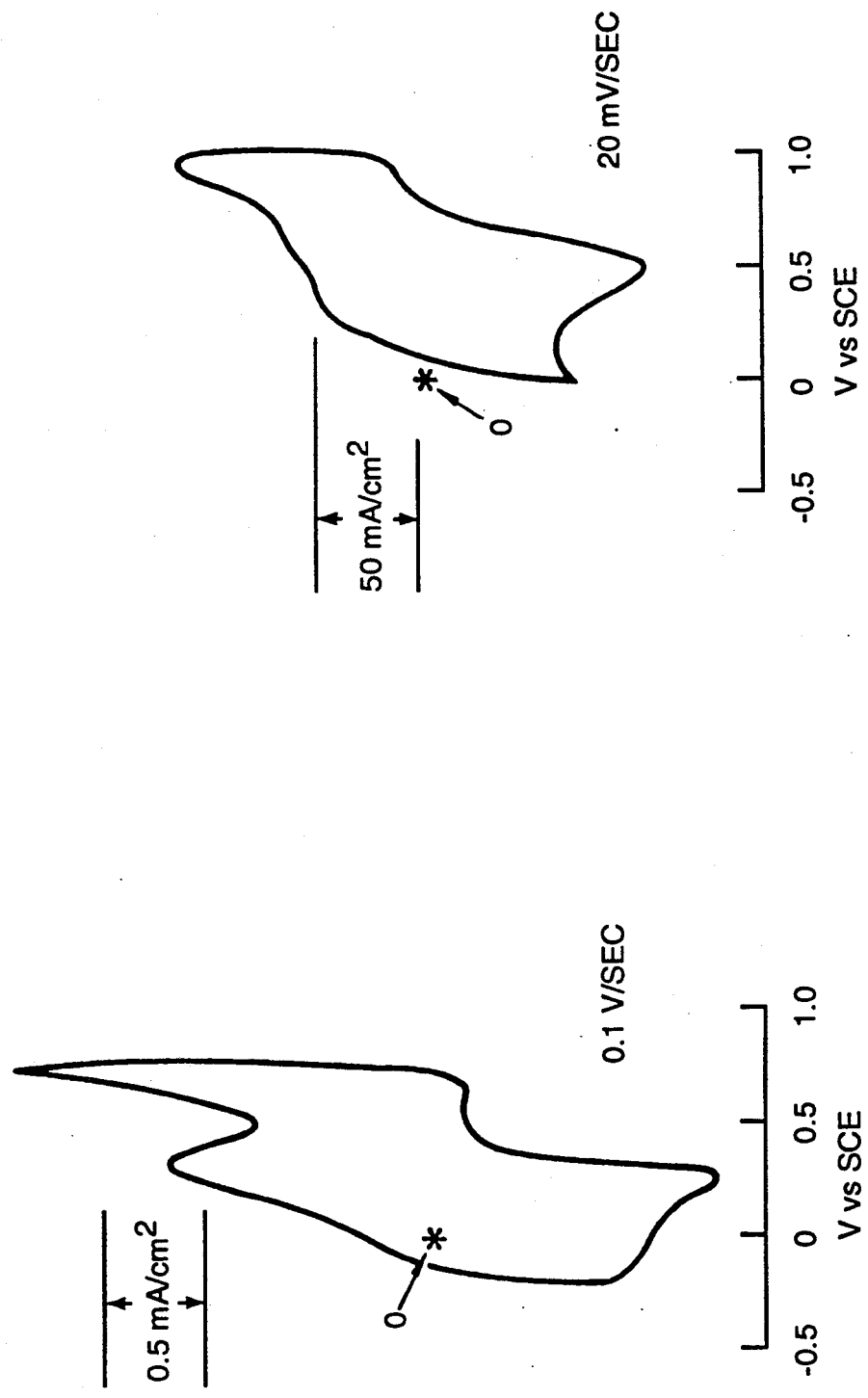
FIG._3D
FIG._3C

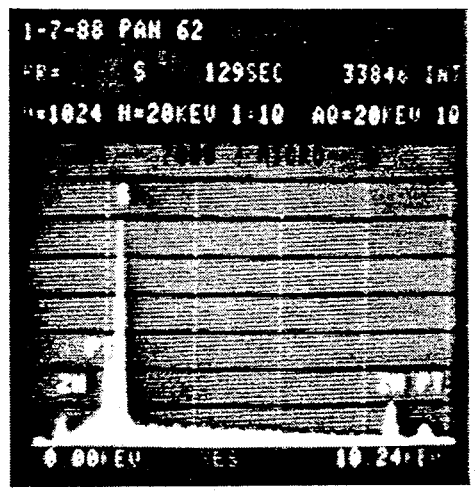
FIG._4
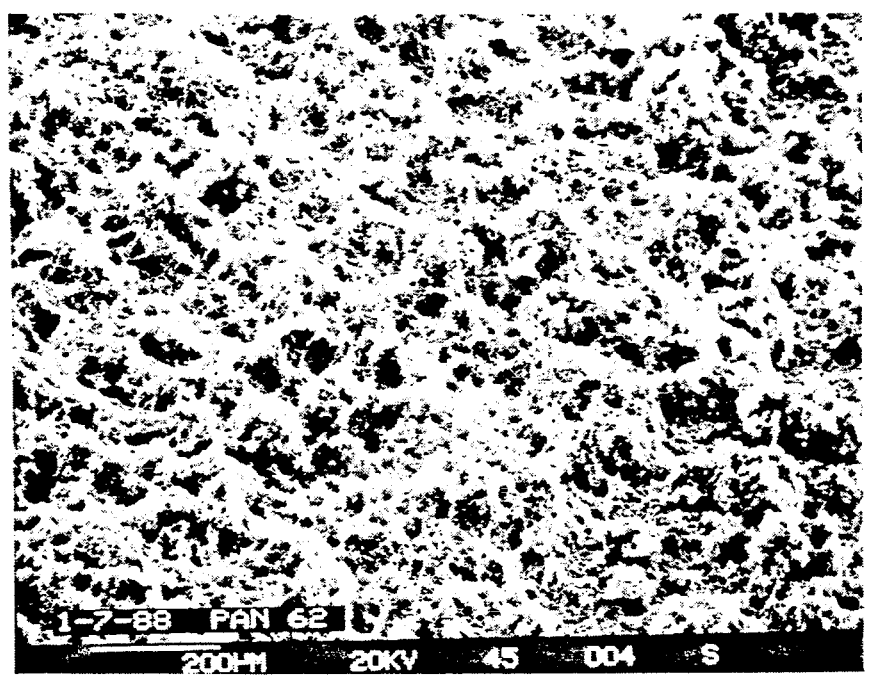
FIG._5

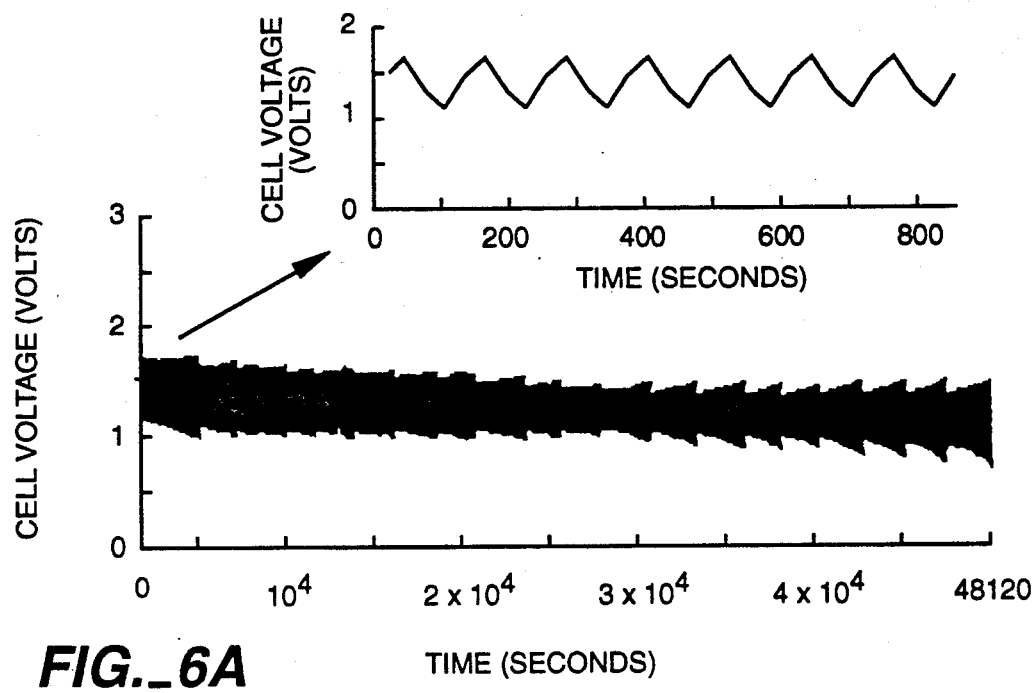
FIG._6A
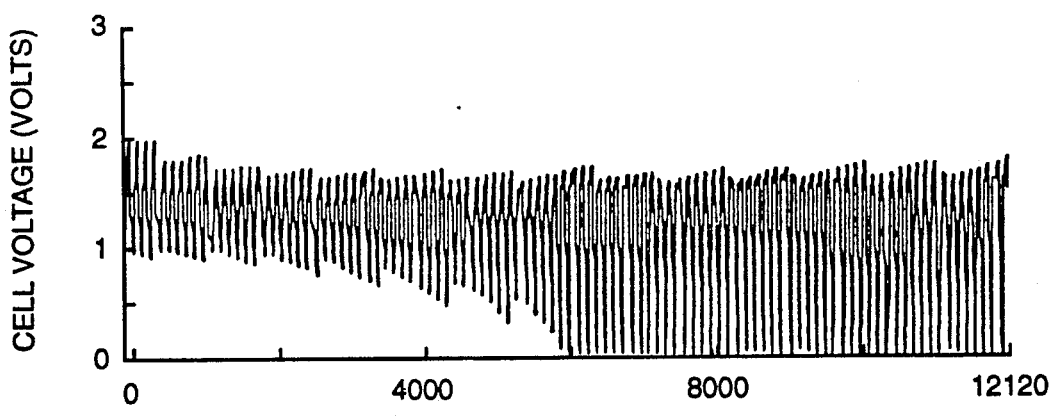
FIG._6B

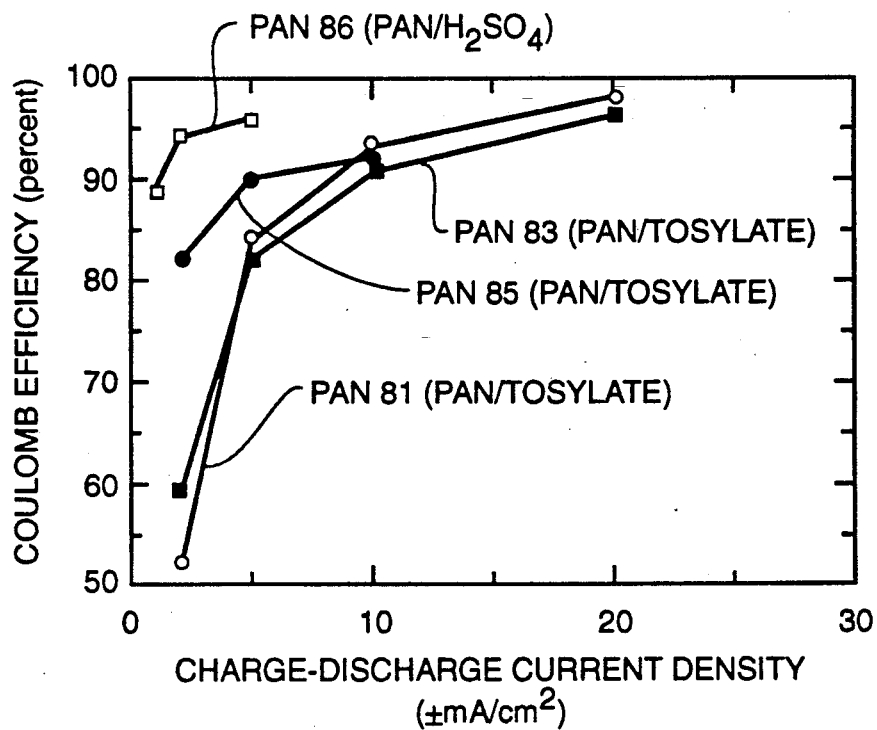
FIG._7A
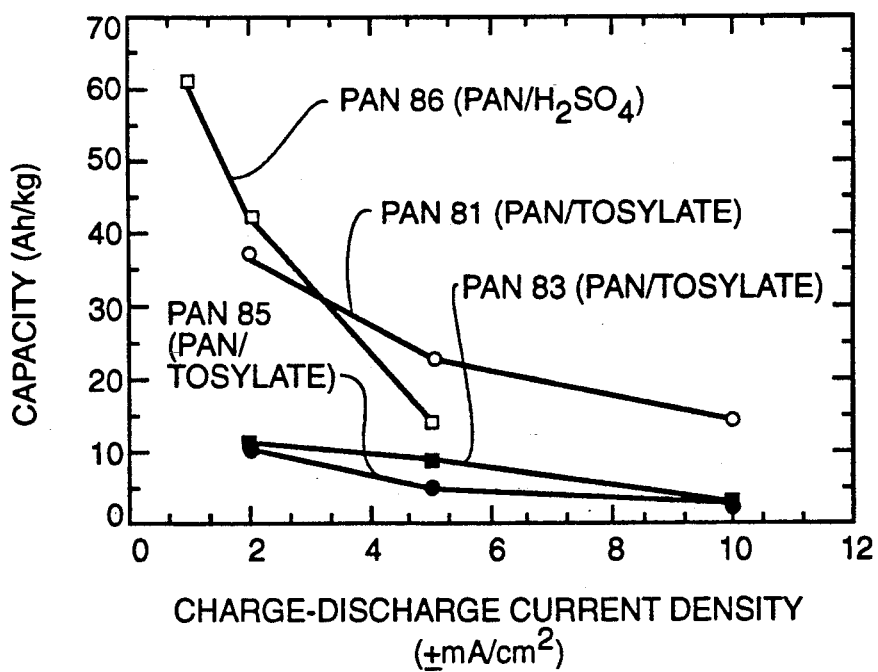
FIG._7B

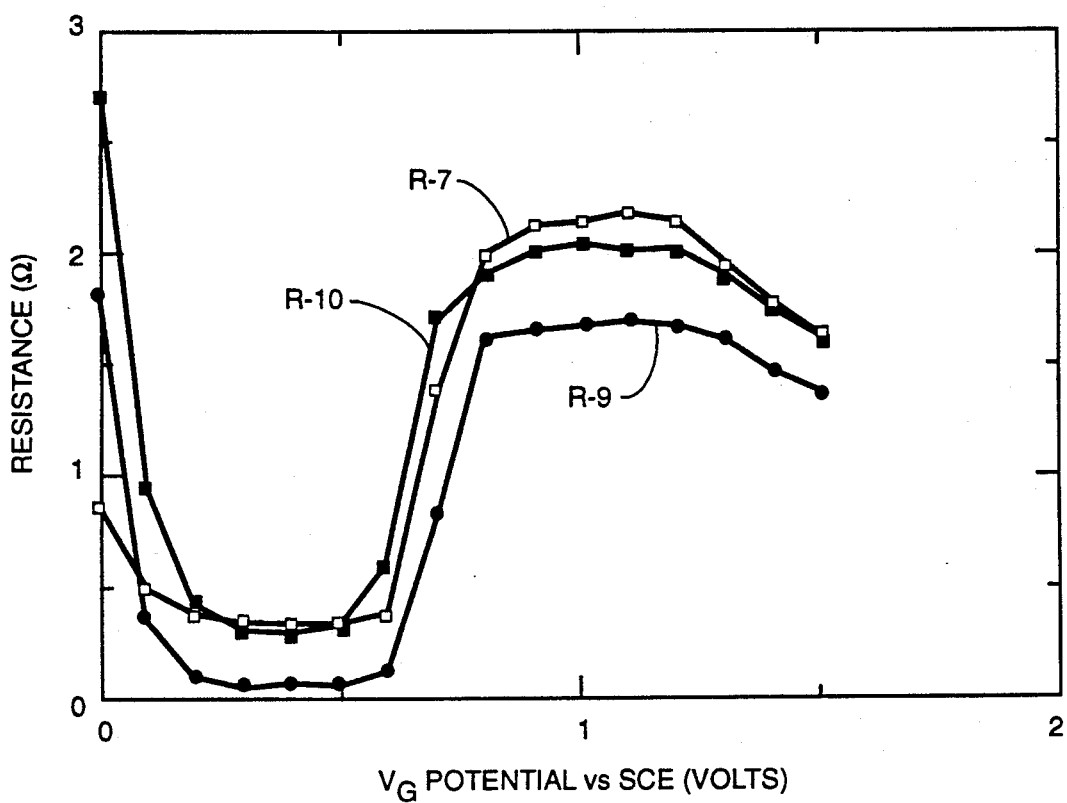
FIG._8

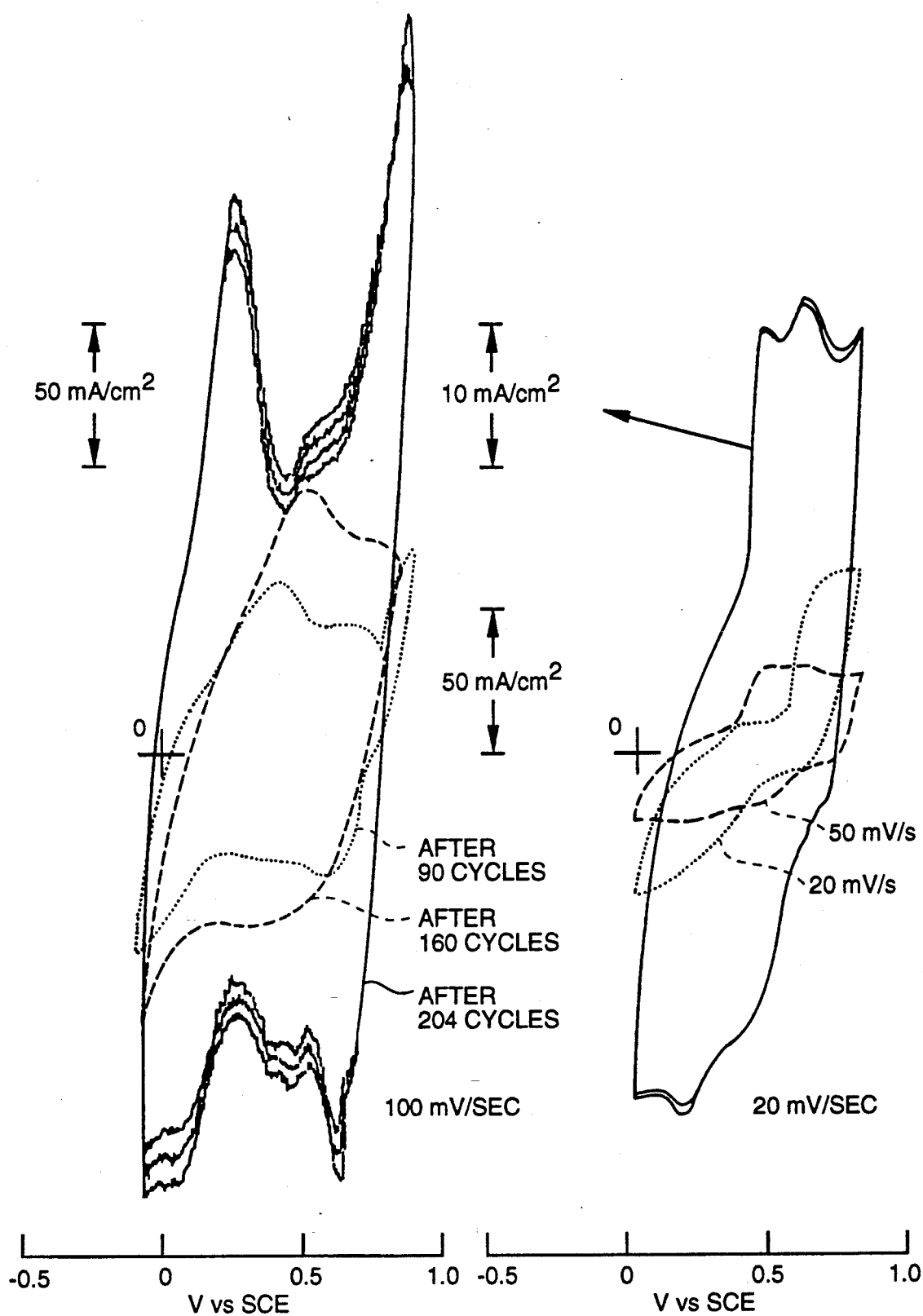
FIG._9A    FIG._9B

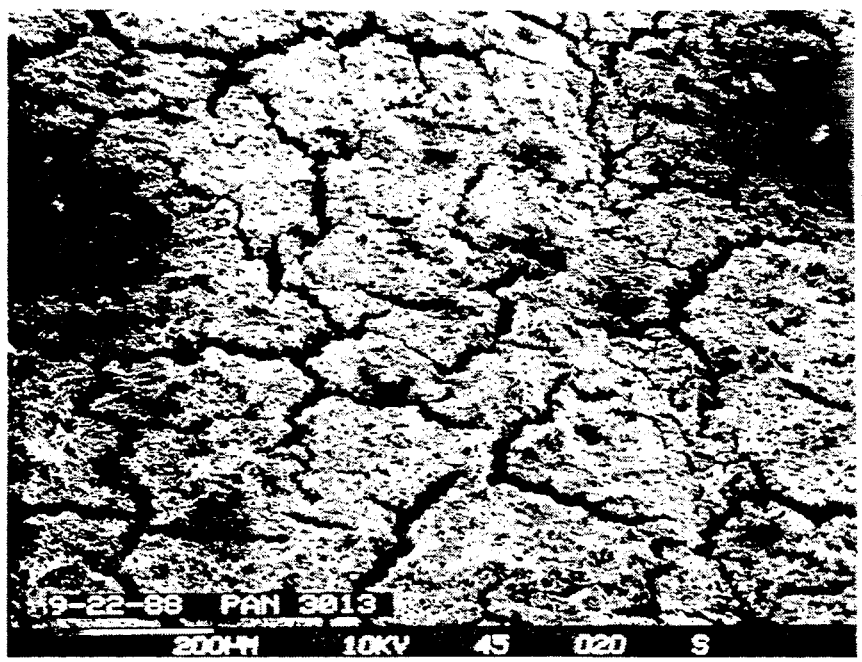
FIG._10A   AT 200 MICROMETERS
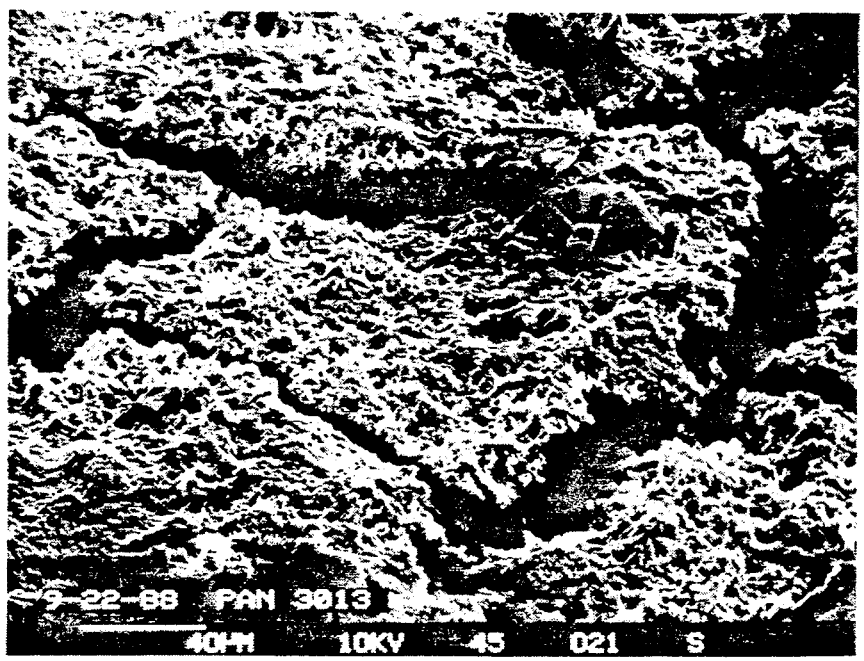
FIG._10B   AT 40 MICROMETERS

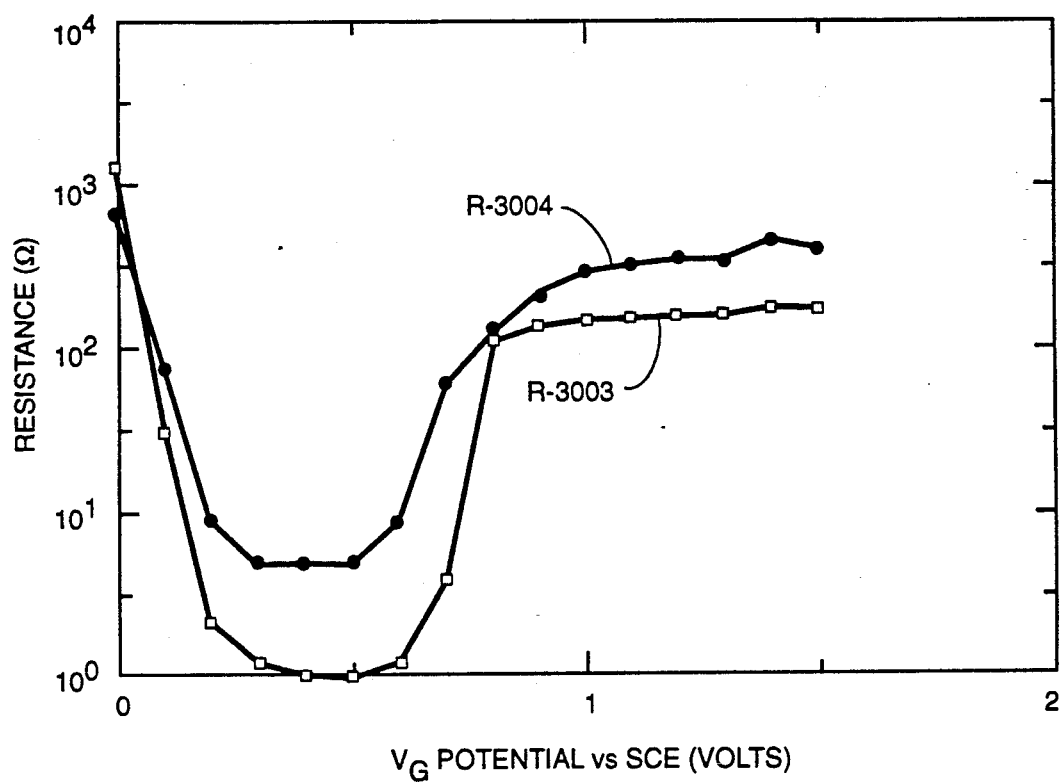
FIG._11

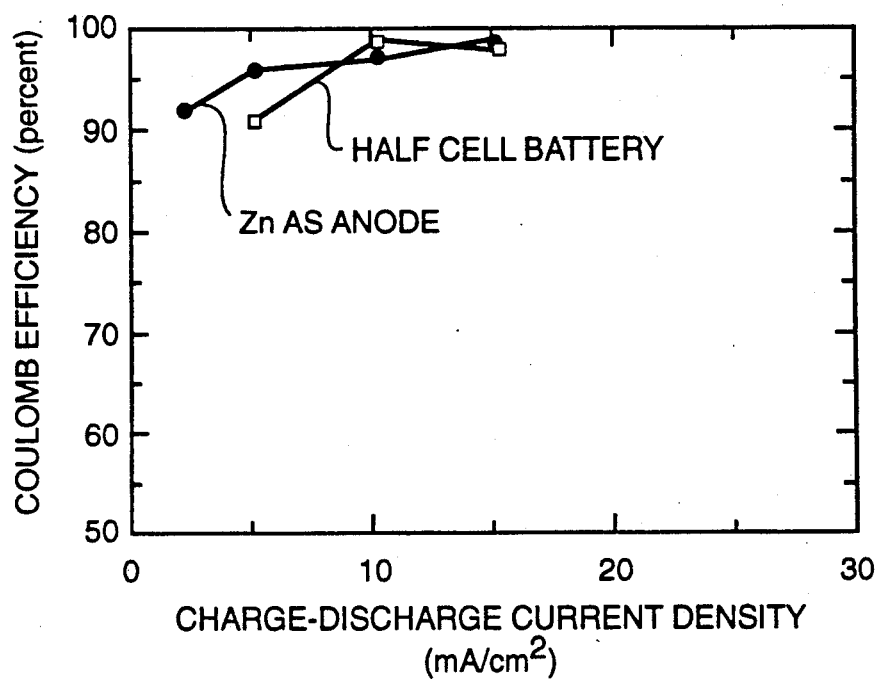
FIG._12A
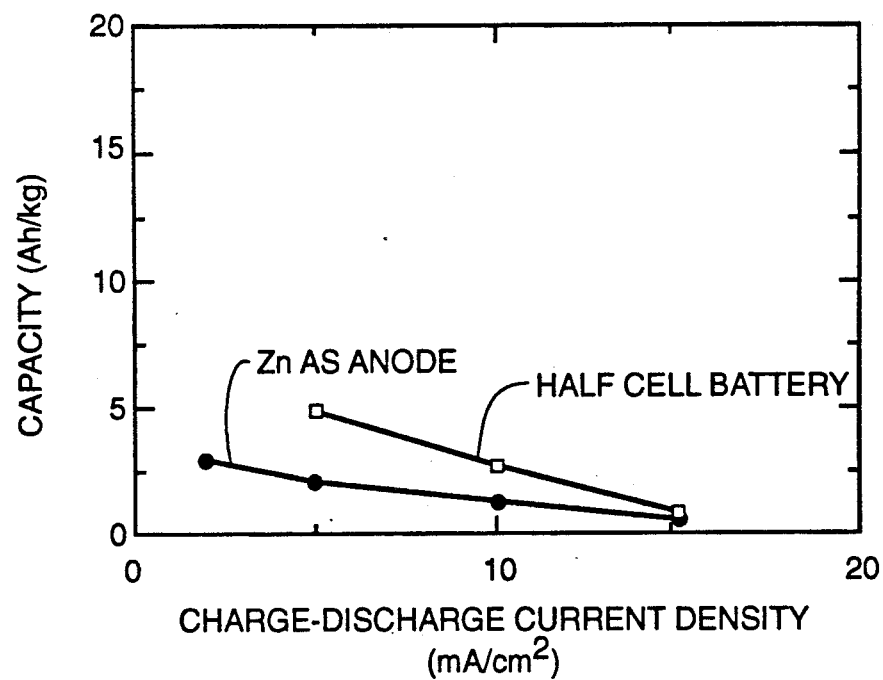
FIG._12B

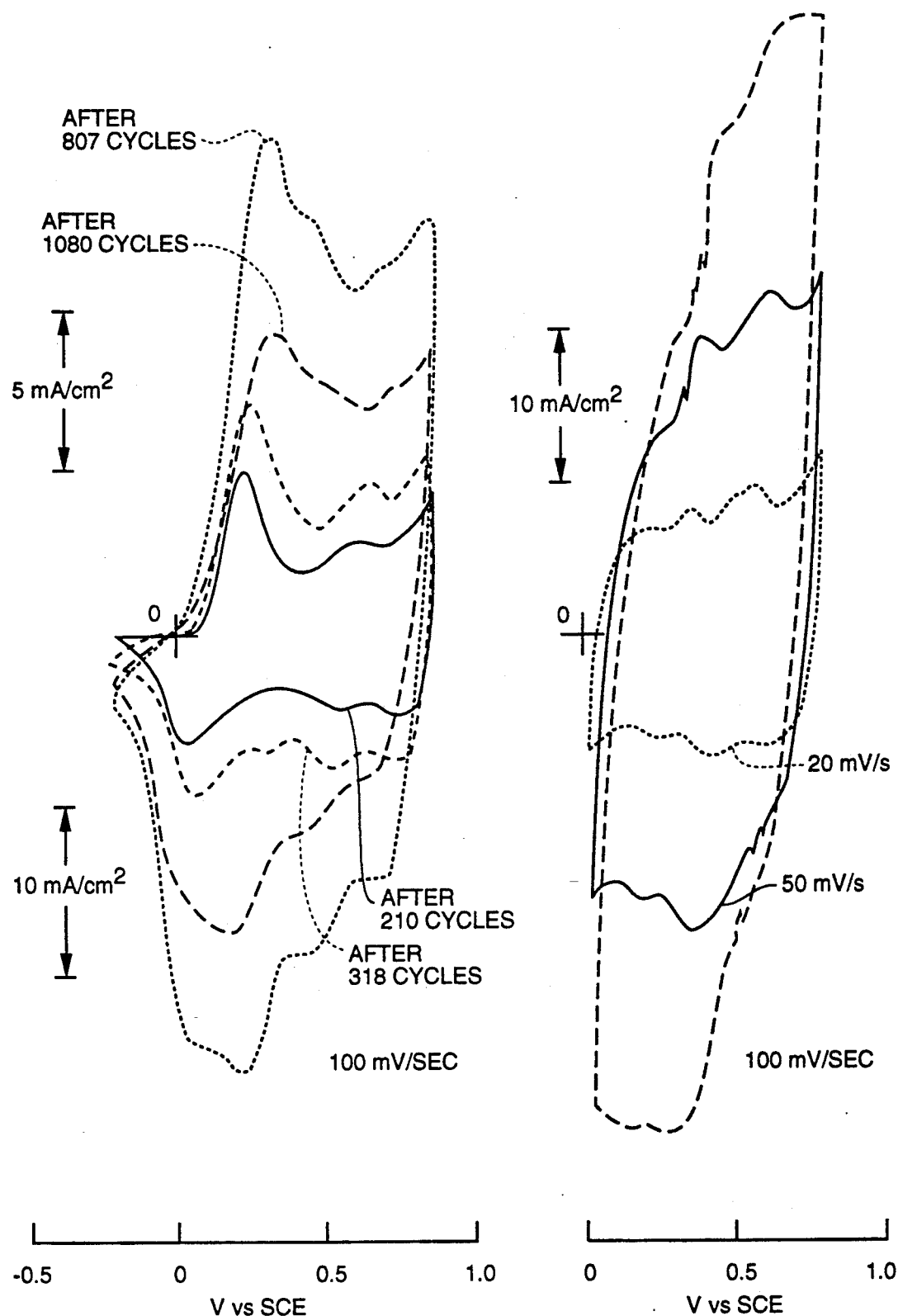
FIG._13A    FIG._13B

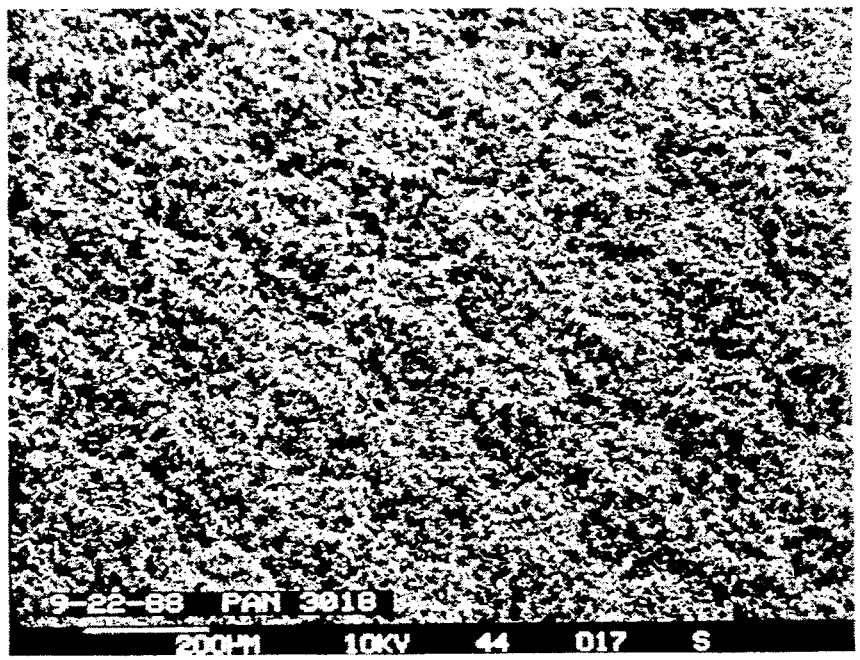
*FIG._14A*   AT 200 MICROMETERS
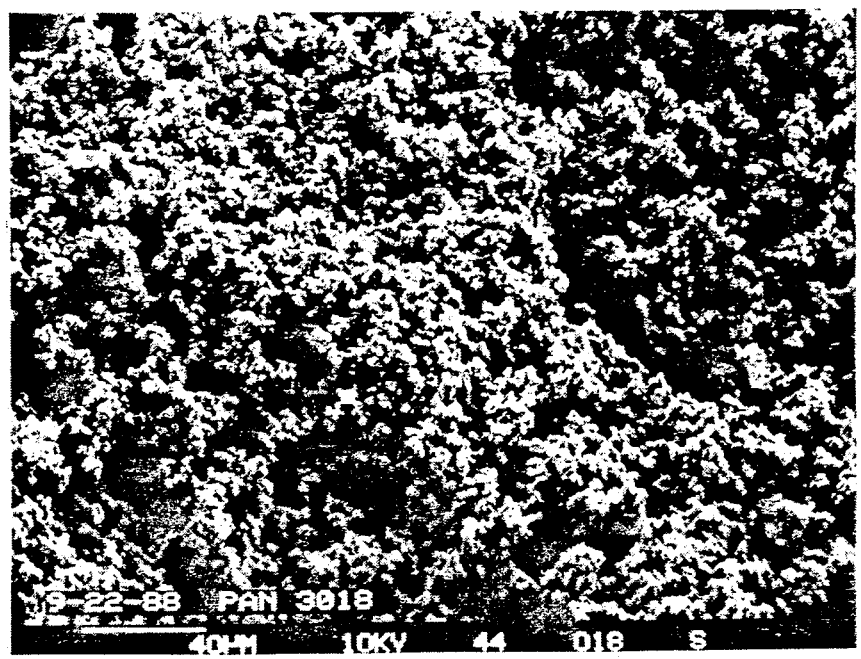
*FIG._14B*   AT 40 MICROMETERS

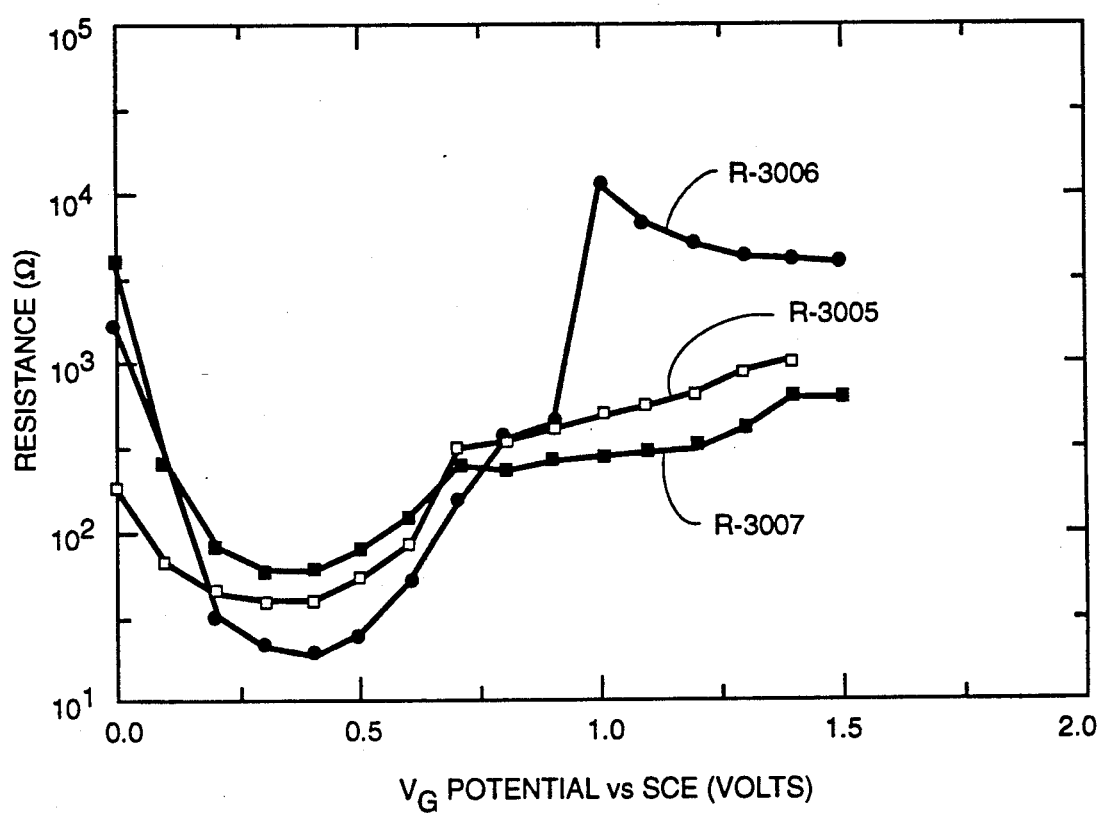
FIG._15

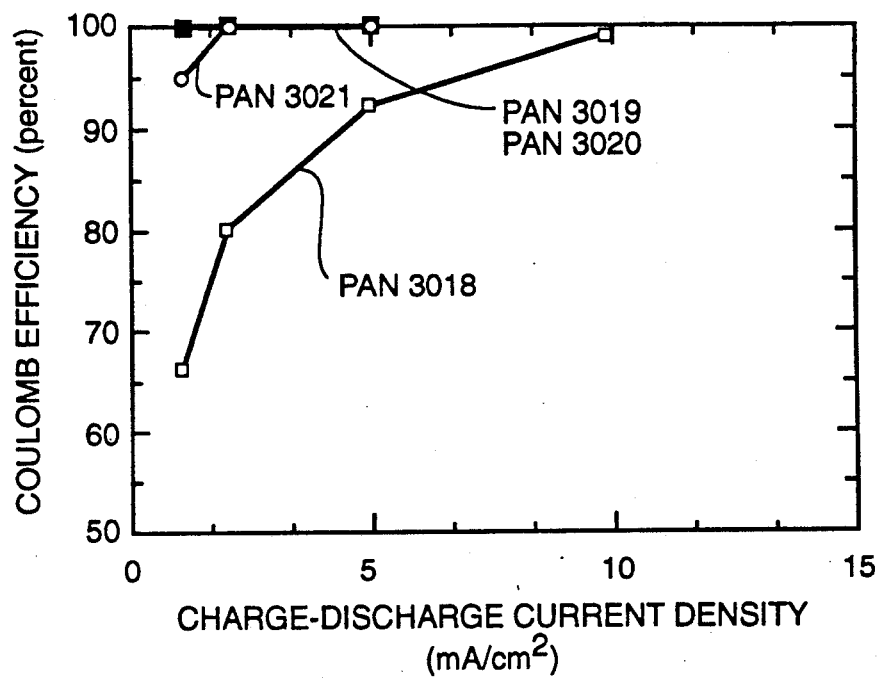
FIG._16A
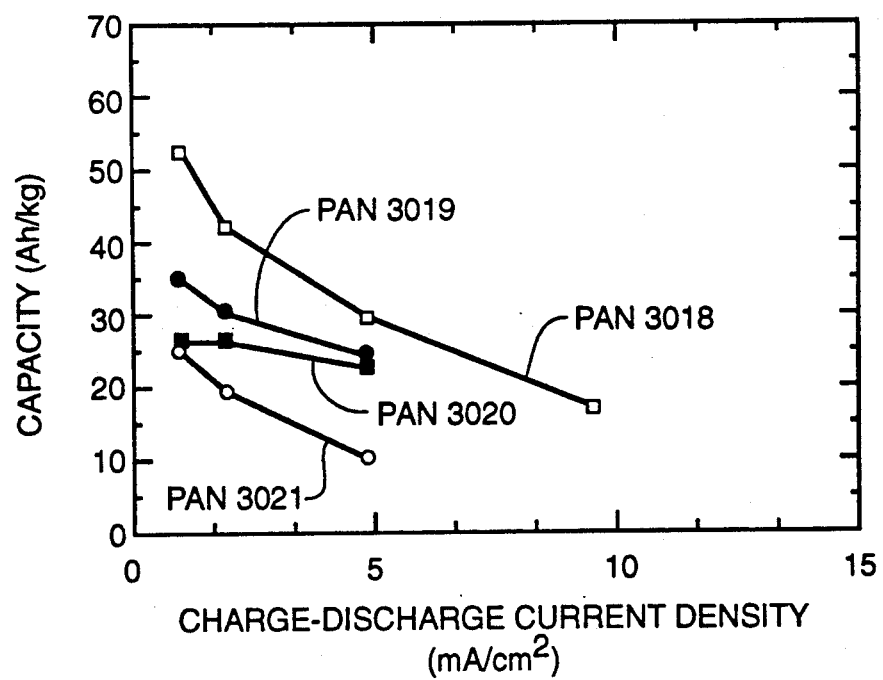
FIG._16B

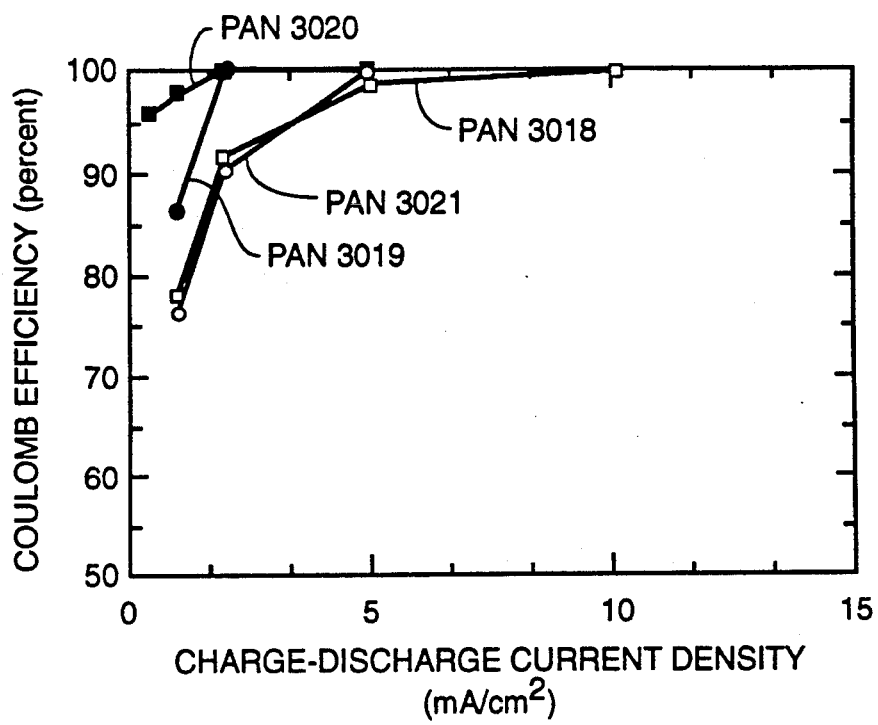
FIG._16C
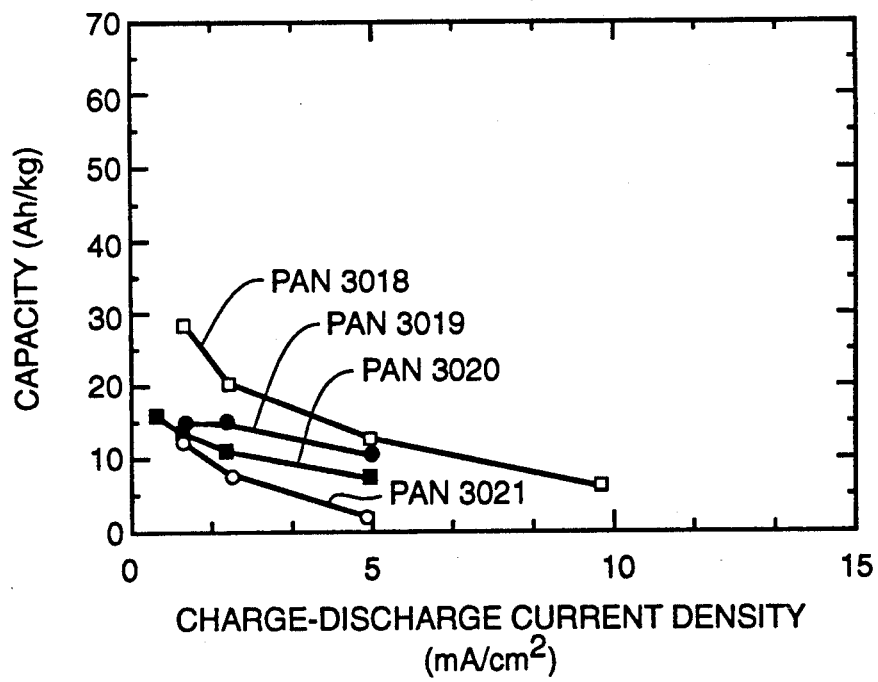
FIG._16D

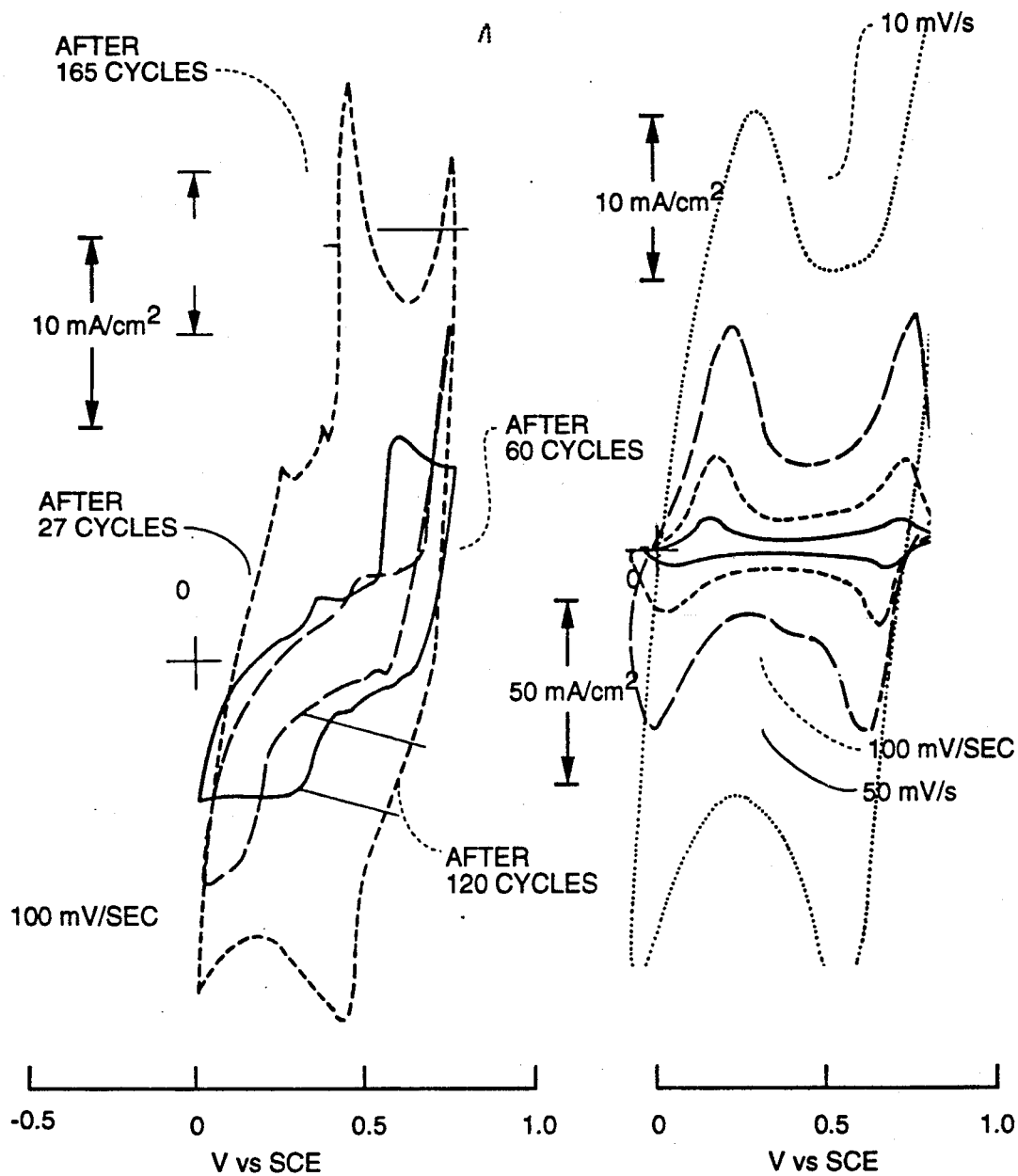
FIG._17A  FIG._17B

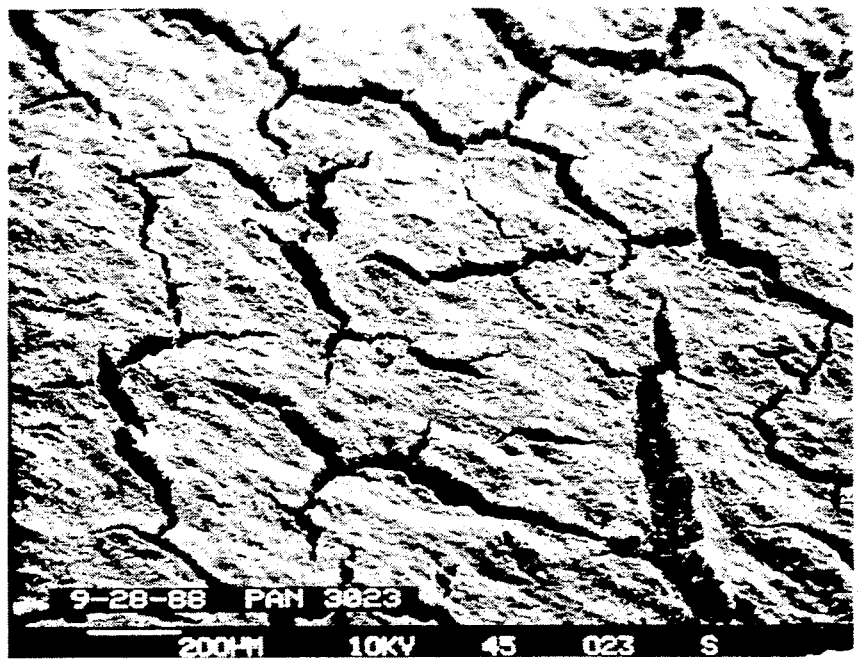
*FIG._18A*  AT 200 MICROMETERS
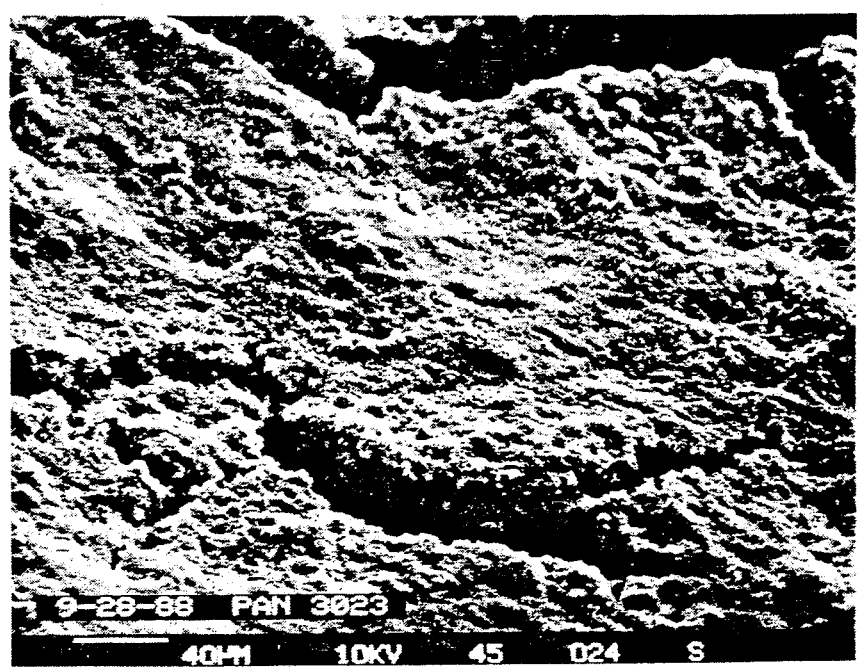
*FIG._18B*  AT 40 MICROMETERS

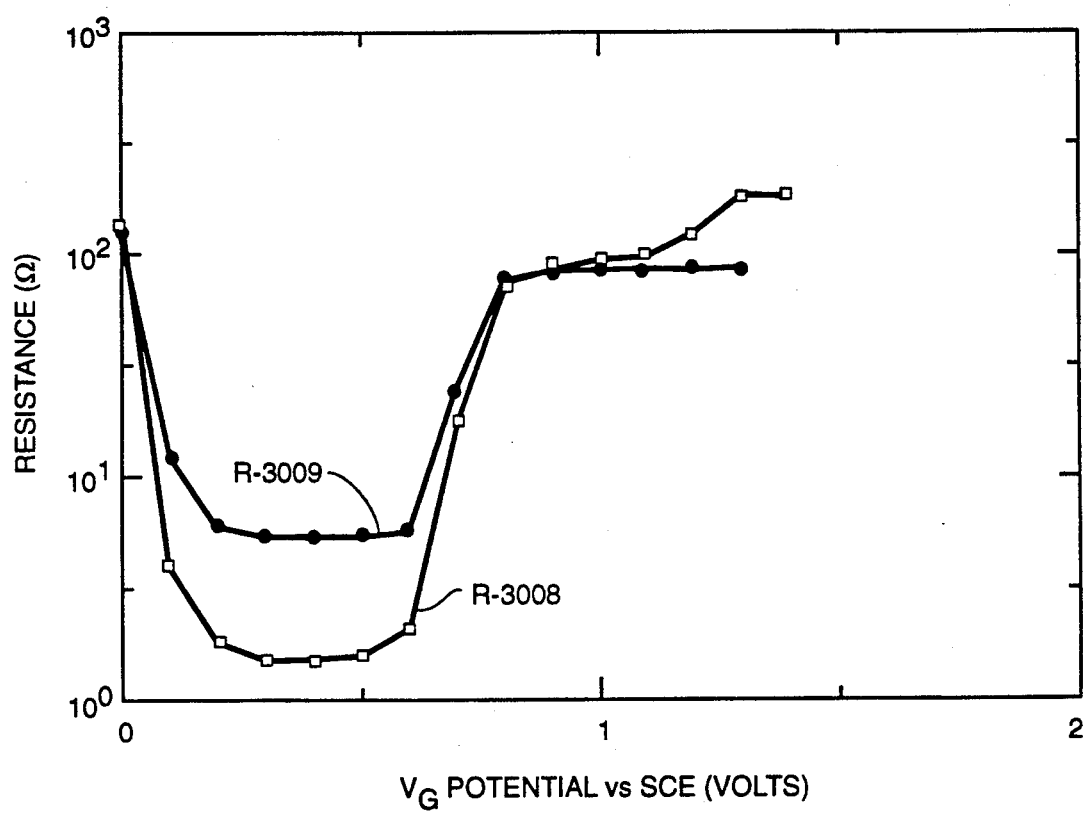
FIG._19

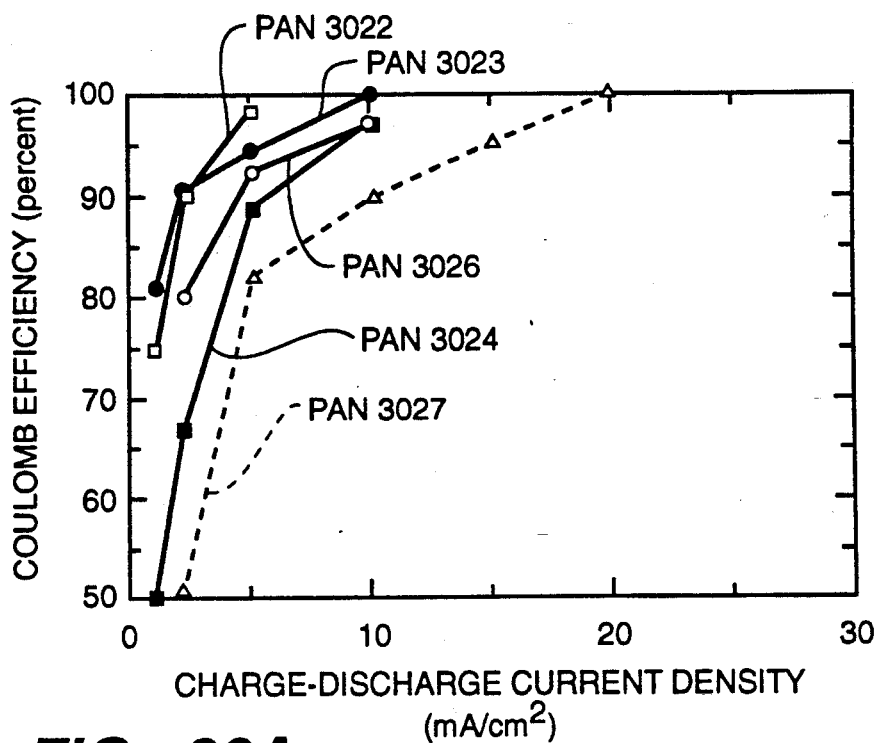
FIG._20A
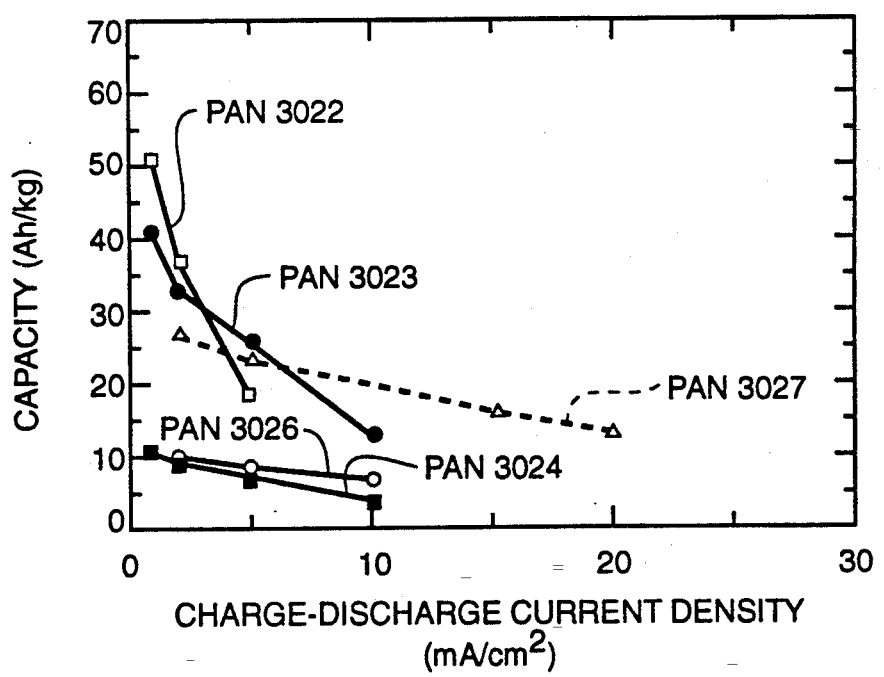
FIG._20B

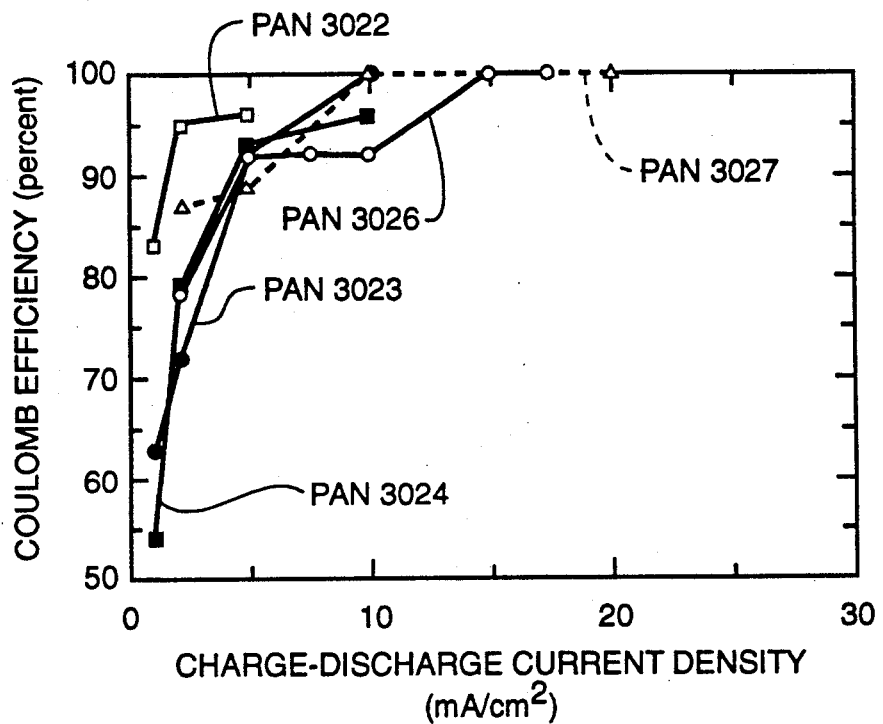
FIG._20C
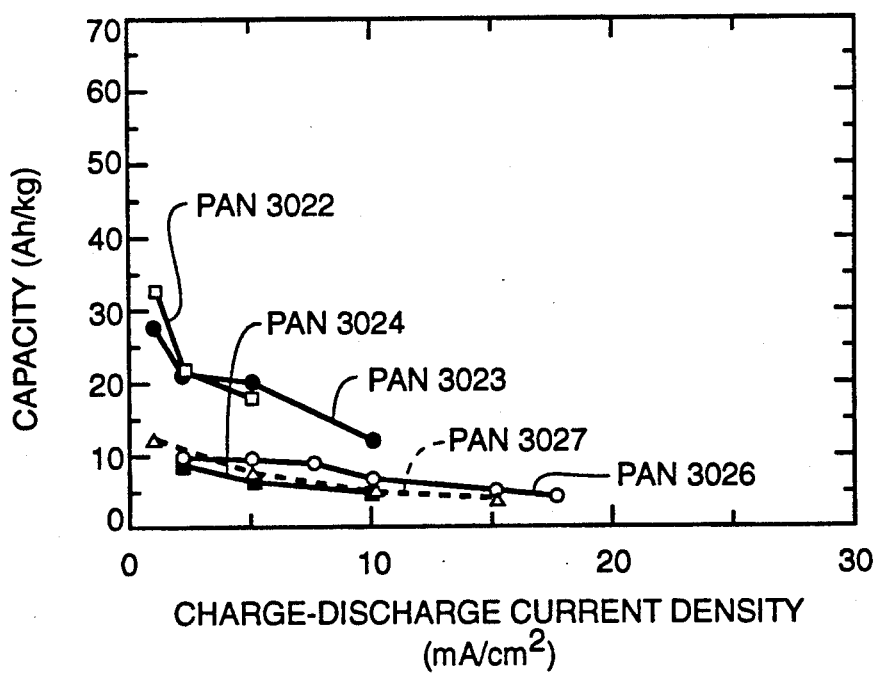
FIG._20D

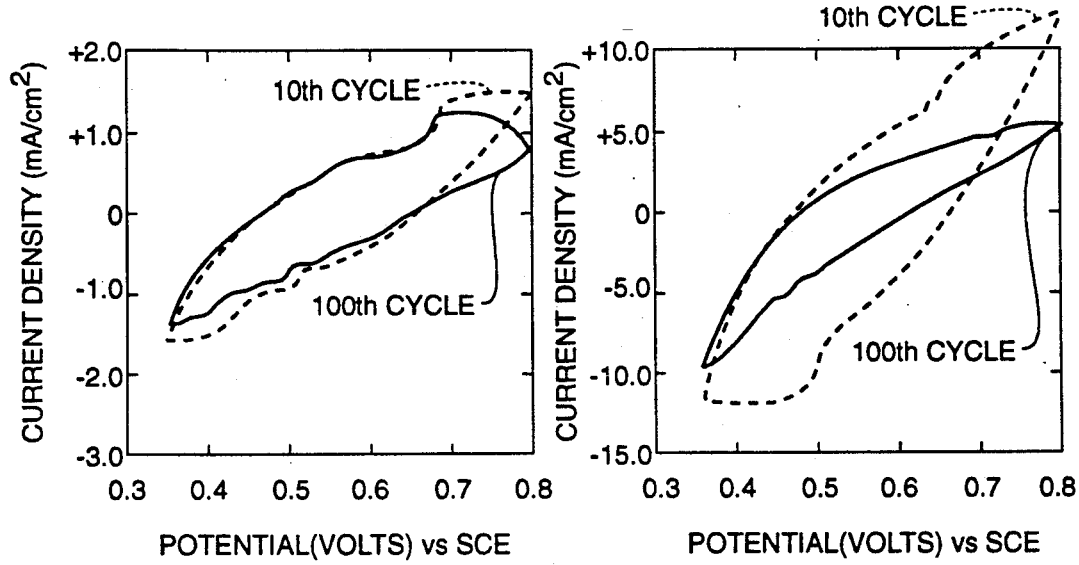
FIG._21A  FIG._21B
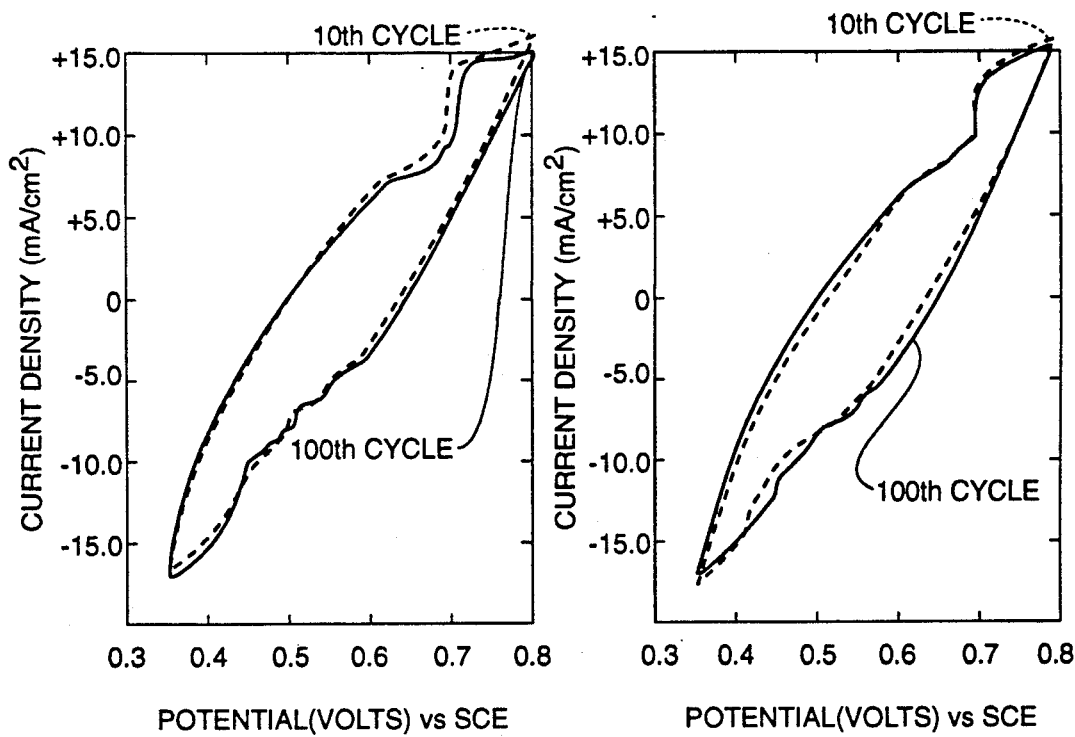
FIG._21C  FIG._21D

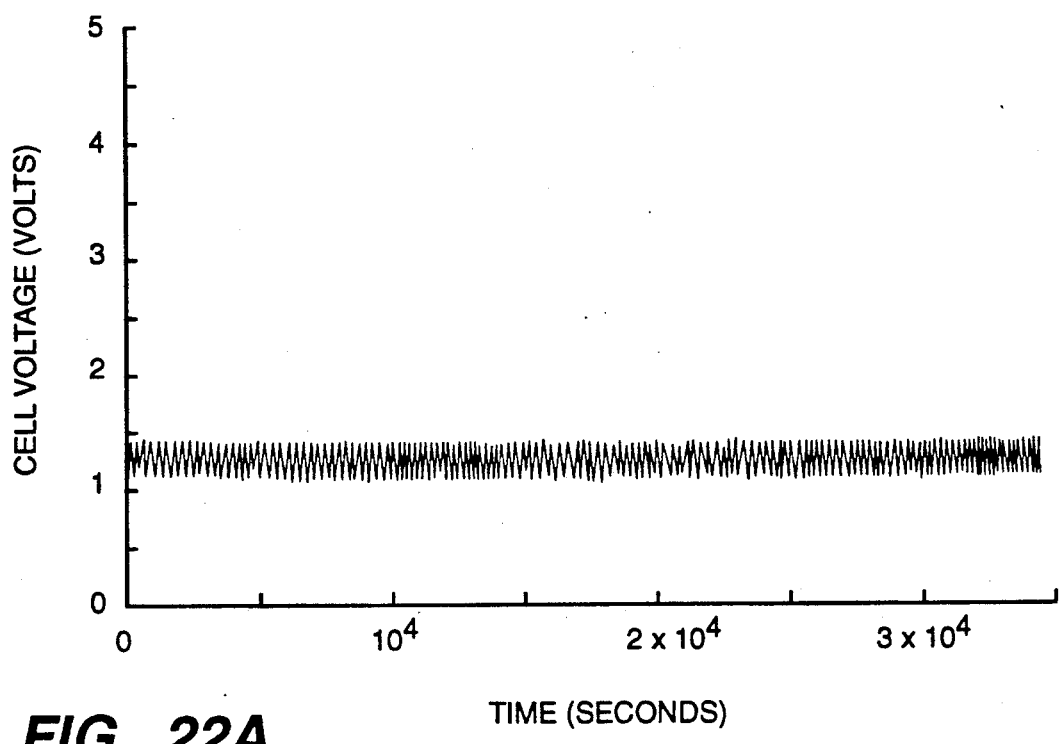
FIG._22A
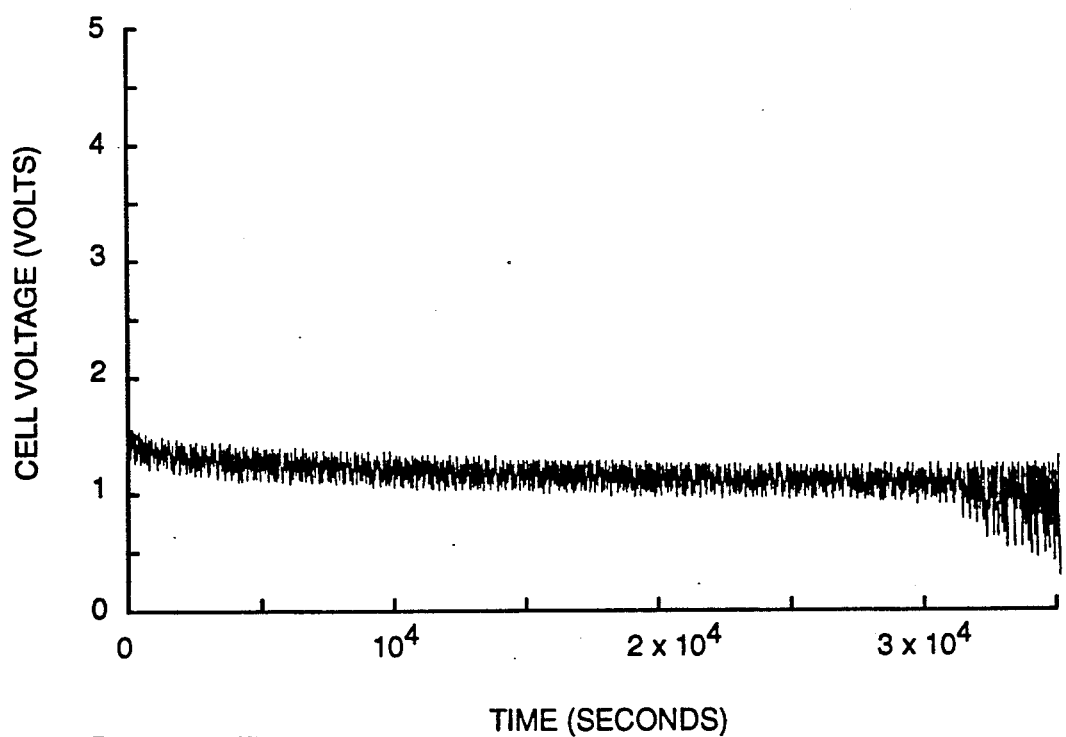
FIG._22B

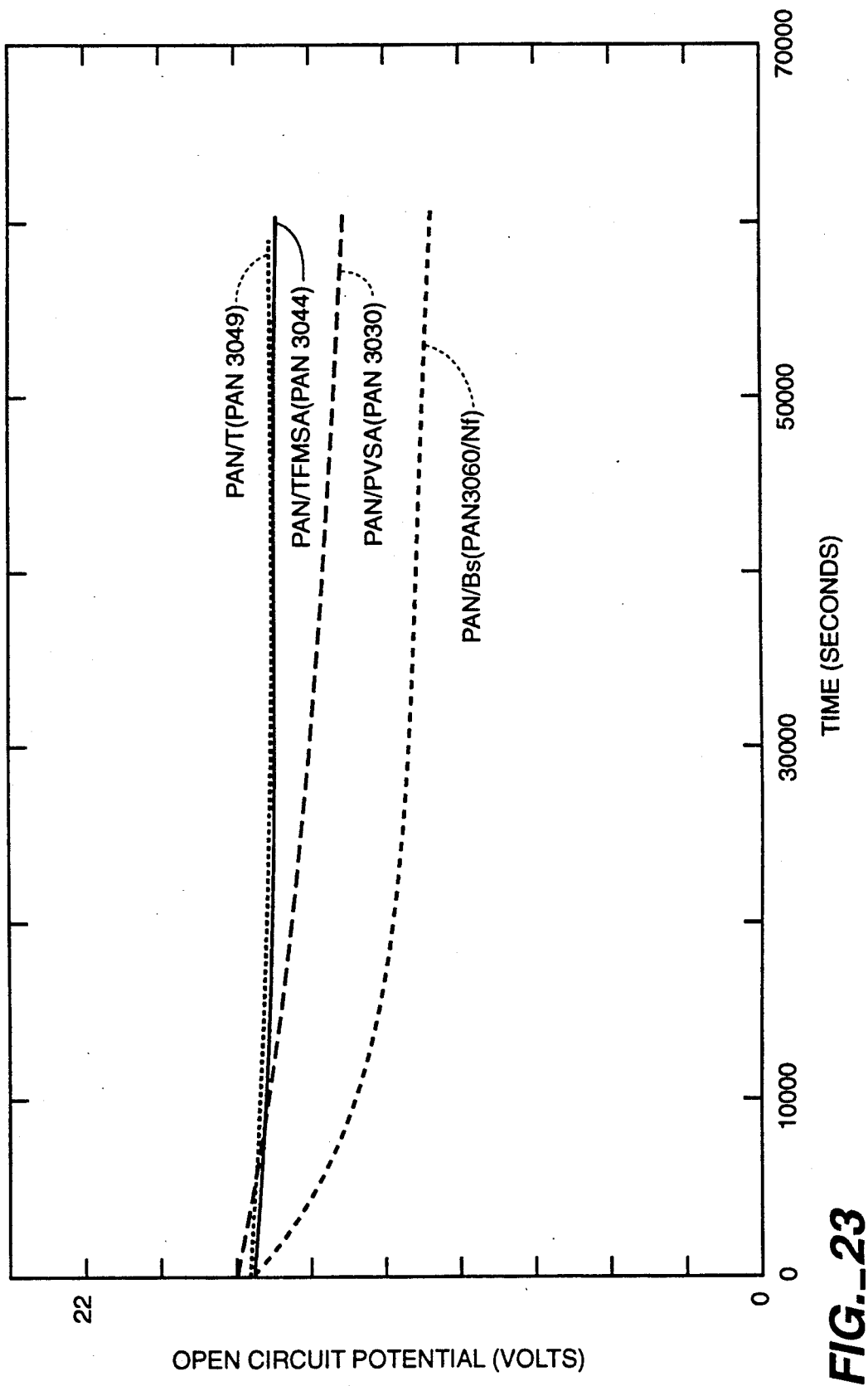
FIG._23

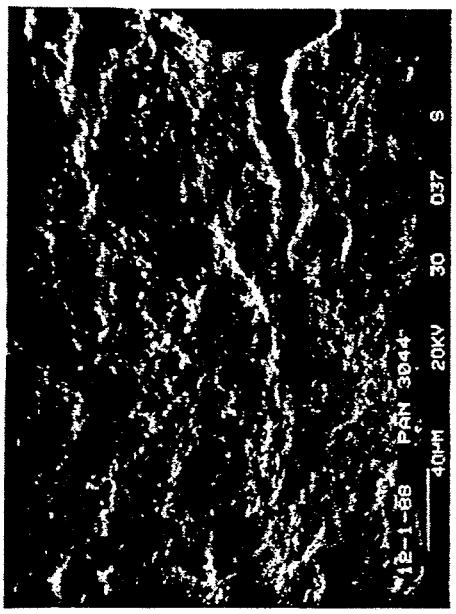
FIG._24B
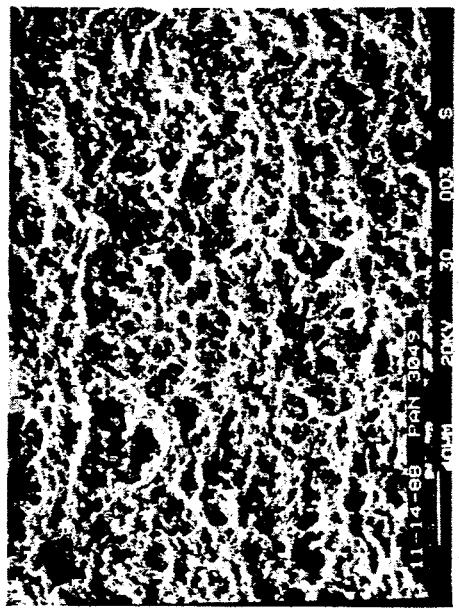
FIG._24D
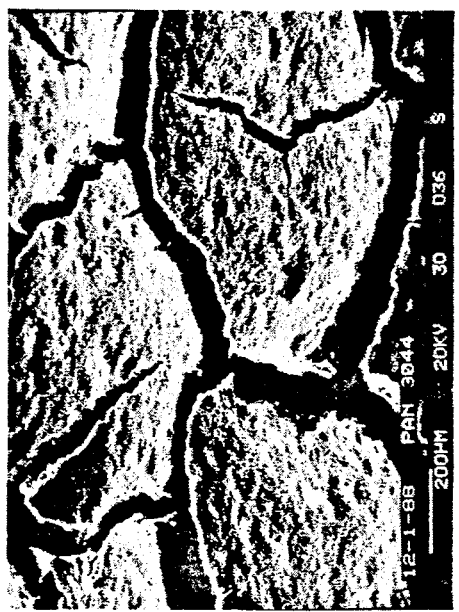
FIG._24A
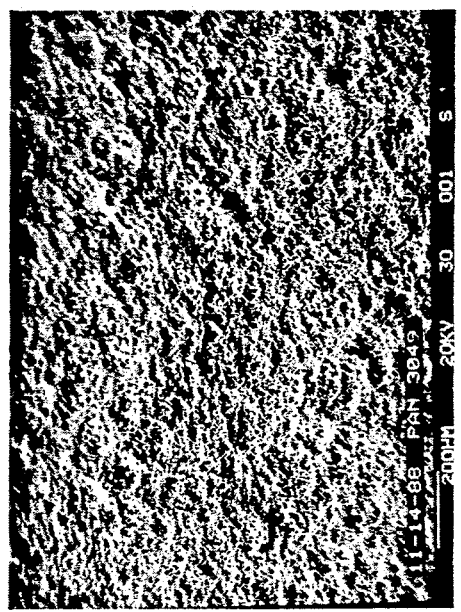
FIG._24C

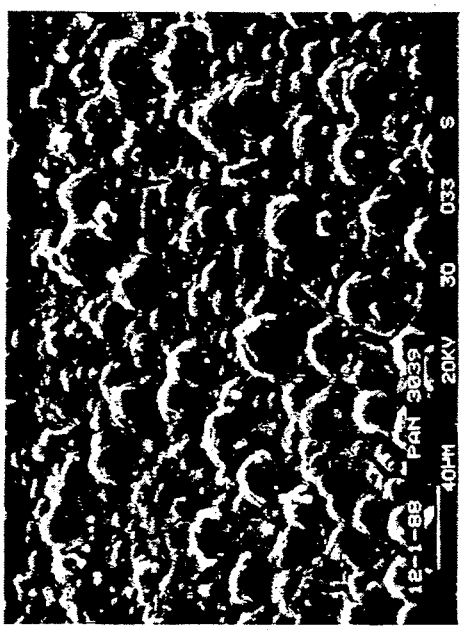
FIG._25B
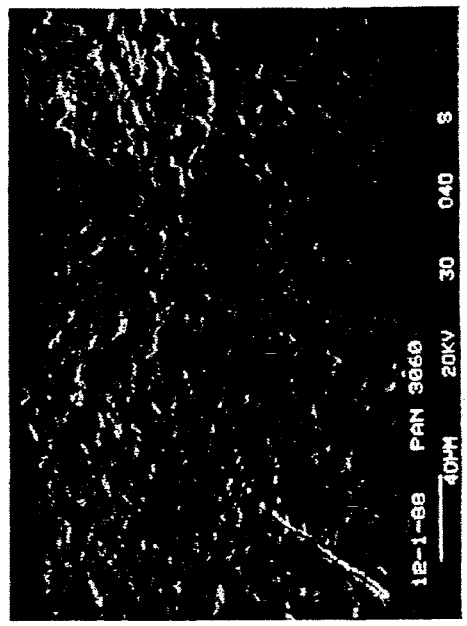
FIG._25D
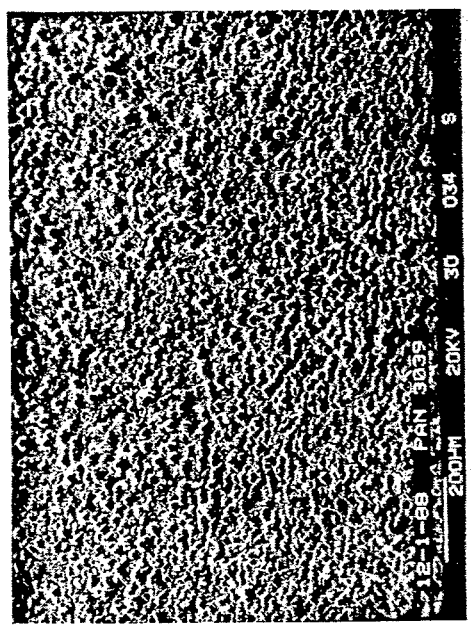
FIG._25A
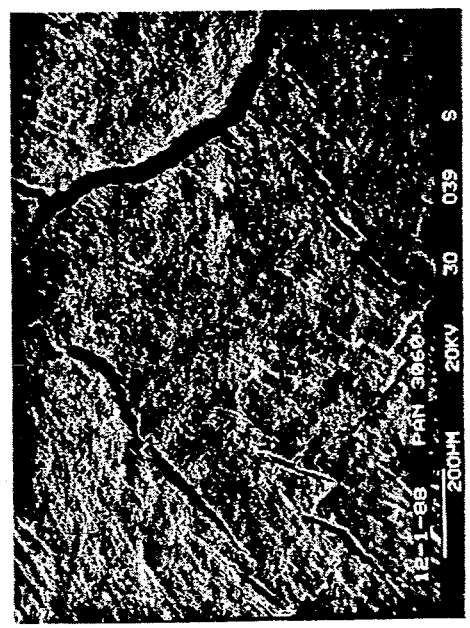
FIG._25C

PERMANENTLY DOPED POLYANILINE AND METHOD THEREOF

Origin of Invention

This is a division of Ser. No. 334,680, filed Apr. 6, 1989, now U.S. Pat. No. 5,002,700, which is incorporated by reference, and is a continuation-in-part of U.S. patent application Ser. No. 238,571 now U.S. Pat. No. 4,973,391, filed Aug. 30, 1988, which is incorporated herein by reference.

teristics of three secondary battery systems (i.e. lead-acid, nickel-cadmium, and Bridgestone's new polyaniline battery).

The following references relate to Table 1:

A. G. MacDiarmid et al. (1986), *Extended Abstracts*, Vol. 86, Abstract #2, 170th Electrochemical Society Meeting, San Diego, Calif., Oct. 19–24.

A. Kitani et al., (1986), *Journal of the Electrochemical Society*, Vol. 133, #6, pp. 1069–1073.

N. Koura et al., *Denki Kagaku*, Vol. 55, #5, pp. 386–391.

TABLE 1

COMPARISON OF DIFFERENT POLYANILINE ELECTRODES

|  | MacDiarmid and Yang (1986) | Kitani et al. (1986) | Kours and Kijima (1987) | | SRI (Preliminary data) |
|---|---|---|---|---|---|
| Polyaniline electrode | powder | e.c. polymer | powder | powder | e.c. polymer |
| Starting materials | aniline $(NH_4)_2S_2O_8$ | 0.1 M aniline 0.1 M $H_2SO_4$ | 0.5 M aniline 0.1 M HCl | 0.5 M aniline 0.1 M $H_2SO_4$ | 0.1 M aniline 1 M tosylate |
| Preparation method | chemical | $PC^d$/Pt | $CP^f$/graph | $CP^f$/graph | $PC^i$/Pt |
| Weight of polyaniline (g) | —0.04 | (2 × 2 cm) | 57 | 5 | —0.024 |
| Electrolyte | $PC/LiClO_4$ | 1 M $ZnSO_4$ (pH 4.6) | $AlCl_3/BPC^g$ | 0.5 M $ZnSO_4$ | 1 M $ZnSO_4$ (pH 2.3) |
| Anode (negative electrode) | Li | Zn (beads) | Al | Zn sheet | Zn sheet |
| Open-cell voltage (V) | 3.3 | —1.1 | 1.7 | 1.4 | 1.3 |
| Short-circuit current (mA) | — | — | — | — | 3.0 |
| Capacity (Ah/kg) | $147.7^b$ | —106 | 130 | 100 | —36 |
| Capacity$^a$ (Ah/kg) | 92.7 | — | — | — | — |
| Power density (kW/kg) | — | — | — | — | 0.2 |
| Energy density (Wh/kg) | $539.2^c$ | <111 | 180 | —140 | —39 |
| Energy density$^a$ (Wh/kg) | 338.3 | — | — | — | — |
| Coulomb efficiency (%) | — | $100^e$ | $85$–$90^h$ | $—85^i$ | $—86^k$ |
| Cycle life (cycles) | — | $<2000^e$ | $—60^h$ | $—60^i$ | $>400^l$ |
| Self-discharge rate (%/month) | 57 | — | 6 | — | high |

$^a$Including the weight of electrolyte.
$^b$Discharge rate of 0.2 mA/cm$^2$.
$^c$At an average discharge voltage of 3.65 V.
$^d$Potential cycle (100 mV/s) for 1000 times between —0.2 V and +0.8 V vs. SCE.
$^e$Cycled between 1.35 V and 0.75 V at a constant current density of 1 mA/cm$^2$.
$^f$Constant potential of 1 V vs. SCE for 72 hours using graphite electrode.
$^g$2:1 mixture of AlCl$_3$ and 1-butylpyridinium chloride.
$^h$At ±4 mA/cm$^2$.
$^i$At ±2 mA/cm$^2$.
$^j$Potential cycle (100 mV/s for 4 hours between —0.2 V and +0.8 V vs. SCE at 30° C.
$^k$Cycled between 1.35 V and 0.75 V at ±10 mA/cm$^2$.
$^l$At ±10 mA/cm$^2$.

BACKGROUND OF INVENTION

1. Field of Invention

The present invention relates to a permanently doped polyaniline and its method of production. More specifically, the present invention relates to a permanently doped polyaniline as a film and its production by the electropolymerization of a solution of aniline and an organic dopant, such as an organic sulfonate, and the use of the film in electrical transmission and storage, e.g. as an electrode in an advanced electrical storage battery.

2. Description of Related Art

During the last five years, a great deal of effort has been expended to develop polyaniline-based rechargeable polymer batteries, especially in conjunction with a lithium anode in nonaqueous electrolytes. The doping rate of polyaniline is about twice that of any other conducting polymers, and the stability of polyaniline is probably the best. Recently, the first commercial, coin-shaped polyaniline/lithium battery suitable as a memory back-up power source was developed by T. Kita et al. for Bridgestone/Seiko. See "Properties of Polyaniline Secondary Battery," Abstract No. 24, 170th Electrochemical Society Meeting, San Diego, Calif., October 1986. Table 1 summarizes typical performance charac- The T. Kita/Bridgestone polyaniline battery offers attractive characteristics such as high operating voltage, good cycle life and low self-discharge rate. In addition, polyaniline batteries in general appear to be intrinsically superior to other existing secondary batteries because of potentially high charge capacity and high energy density (features not yet realized in the Bridgestone battery). Furthermore, although the polyaniline/lithium nonaqueous battery developed by Bridgestone/Seiko is said to exhibit excellent shelf-life, i.e., little self-discharge, there are difficulties associated with the use of a nonaqueous solvent (e.g. propylene carbonate) in conjunction with a lithium electrode in rechargeable batteries, including:

1. Low capacity (less than 0.004 Ah) and low current output (less than 5 mA).

2. Corrosion is a problem: the lithium surface is gradually covered by some passive film such as Li$_2$CO$_3$ during the repeated cycling of charge and discharge.

3. The high cathodic potential of the Li/Li$^+$ couple often causes solvent decomposition.

Japanese patent application [JP 62/12073] by Hitachi/Showa Denko discloses the use of tosylate in conjunction with polyaniline. It is apparent that the two batteries are quite different in terms of their fundamental principles. The Hitachi/Showa Denko battery is essentially a conventional polyaniline/Li nonaqueous battery, in which anions such as $ClO_4^-$ are dopants in the positive polyaniline electrode. The tosylate is used merely as a sacrificial material. (Anions with a larger ionic radius, such as tosylate, are added during electropolymerization of aniline. The grown polyaniline film is rinsed thoroughly with water to get rid of the added anions, leaving the polyaniline with a high microporous channel structure through which small anions, e.g. $ClO_4^-$, can easily diffuse in and out).

Organic conducting polymers such as polypyrrole (PPy), polythiophene (PTP), polyaniline (PAn or PAN) and their derivatives are gaining in popularity for potential use in optical, electronic and electrochemical devices. See, for example, F. Garnier et al., *Journal of Electroanalytical Chemistry* (1983), Vol. 148, p. 299; H. Kaezuka, et al., *Journal of Applied Physics* (1983), Vol. 54, p. 2511; and A. Mohammadi et al., *Journal of the Electrochemical Society* (1986), Vol. 133, p. 947.

A major disadvantage of these electrically conducting polymers in any configuration is that they usually have poor mechanical properties. See, for example, O. Niwa, et al., *Journal of the Chemical Society* (1984), p. 817; S. E. Lindsey, et al., "Synthetic Methods," (1984/1985), Vol. 10, p. 67; F. R. Fan, et al., *Journal of the Electrochemical Society*, Vol 133, p. 301; and R. M. Penner, et al., *Journal of the Electrochemical Society* (1986), Vol. 133, p. 310.

Several approaches may be useful to improve the physical and mechanical properties of the conducting polymers. For instance, the polymerization of pyrrole in thick electroactive polymer networks such as poly(vinylchloride), poly(vinyl alcohol), NAFION®, a trademark of the E. I. DuPont Co., Inc. of Wilmington, Del., for a perfluorinated sulfonic acid material and membrane, and NAFION®-impregnated GORE-TEX®, where GORE-TEX® is a trademark of W. F. Gore and Associates of Elkton, Md., for a porous polytetrafluoroethylene material has been reported in the literature.

T. Harai, et al., *Journal of the Electrochemical Society* (1988), Vol. 135 (#5), p. 1132-1137 reported that the anodic polymerization of pyrrole, 3-methylthiophene and aniline at NAFION-coated electrodes gives electrically conducting polyaniline (NAFION) composite films. These composites show an improvement of the polypyrrole electrochromic response and by the efficient utilization of stored charge by the composite film electrodes.

All of the disclosure in the references cited herein are incorporated herein by reference.

These references do not teach or suggest a permanently doped polyaniline for use as a secondary battery as is described in the present invention.

SUMMARY OF THE INVENTION

The present invention relates to an electrically conducting polymer having essentially permanent self-doping properties, said polymer comprising:

(a) electrically polymerized polyaniline matrix chemically combined with (b) an organic dopant having at least one sulfonic acid functional group.

In a preferred embodiment of the present invention, the electrically conducting polymer combination, the organic dopant is independently selected from benzenesulfonic acid, toluenesulfonic acid, benzenesulfonyl chloride, 2-ethylbenzenesulfonic acid, vinyl sulfonic acid, dodecylbenzenesulfonic acid, poly(vinylsulfonic) acid, trifluoromethanesulfonic acid, 1-butanesulfonic acid, modified NAFION ™ solution, 2,3,5-trichlorobenzenesulfonic acid or vinylphenylsulfonic acid or the alkali metal salts thereof.

In another embodiment, the present invention is a method to produce a water-insoluble polyaniline to which an organic dopant is chemically bound to the polyaniline, which method comprises:

(a) electropolymerizing aniline in an aqueous solvent which contains the organic dopant.

Additional embodiments are found in the description below and in the claims.

BRIEF DESCRIPTION OF DRAWINGS

FIG. 1 shows a schematic diagram of the rechargeable polyaniline battery.

FIG. 2A shows the resistance of various conventional polyaniline films as a function of gate potential, $V_G$, between two adjacent micro-electrodes.

FIG. 2B shows the resistance of permanently doped polyaniline-tosylate films as a function of gate potential, $V_G$, between two adjacent micro-electrodes.

FIG. 3 over all shows typical cyclic voltammograms of aniline during polymerization and grown polyaniline films in aqueous solution. FIG. 3A shows aniline/sulfuric acid during polymerization on a 3-dimensional electrode substrate (e.g., fat posts). FIG. 3B shows aniline/tosylate during polymerization on a 3-dimensional fat posts electrode. FIG. 3C shows polyaniline/sulfuric acid film production in aqueous 0.5M sodium sulfate at pH 1.2. FIG. 3D shows polyaniline/tosylate film electropolymerization in aqueous 0.5M sodium sulfate at pH 1.2.

FIG. 4 shows an X-ray fluoroescence spectroscopic analysis (EDAX) spectrum of the polyanhiline/tosylate.

FIG. 5 shows a scanning electron micrograph (SEM) of the polyaniline/tosylate.

FIG. 6 shows a comparison of the long-term charge discharge curves (cell voltage versus time) at $\pm 10$ milliamperes/centimeter$^2$ in 1M zinc sulfate at pH 2.3. FIG. 6A self-doped polynailine/tosylate (1M in tosylate and 0.1M aniline on a 3-dimensional fat post electrode with a zinc-dispersed NAFION film as an anode. FIG 6B. shows a conventional (undoped) polyaniline film (0.1M sulfuric acid and 0.1M aniline) on a 3-dimensional fat COCO electrode with a zinc sheet anode.

FIG. 7 shows the coulomb efficiency and capacity of various polyaniline electrodes as a function of charge-discharge current density in 1M zinc sulfate. FIG. 7A shows the coulomb efficiency of the half cell battery. FIG. 7B shows the capacity when zinc is used as an anode.

FIG. 8 shows the resistance of various polyaniline films as a function of gate potential, $V_G$, between two adjacent platinum electrodes.

FIG. 9 shows typical cyclic voltammograms of polyaniline/benzenesulfonic acid. FIG. 9A shows the electropolymerization of 0.1M aniline and 1M benzenesulfonic acid. FIG. 9B shows the electropolymerization of polyaniline/benzenesulfonic acid film in aqueous 0.5M sodium sulfate at pH 1.2.

FIG. 10 shows scanning electron micrographs of polyaniline/benzenesulfonic acid film. FIG. 10A is at the 200 micrometer scale. FIG. 10B is at the 40 micrometer scale.

FIG. 11 shows a graph of the resistance of polyaniline/benzenesulfonic acid as a function of gate potential, $V_G$, (in volts versus SCE) between two adjacent microelectrodes.

FIGS. 12A and 12B show graphs of the coulomb efficiency and capacity of polyaniline/benesulfonic acid electrode as a function of charge-discharge current density in 1M sulfuric acid.

FIGS. 13A and 13B show typical cyclic voltammograms of polyaniline/polyvinylsulfonic acid. FIG. 13A is the voltammogram during polymerization 0.1M aniline and 12.5% polyvinylsulfonic acid. FIG. 13A is the voltagram for polyaniline/polyvinylsulfonic acid film in aqueous 0.5M sodium sulfate at pH 1.2.

FIG. 14 shows scanning electron micrographs of polyaniline/polyvinylsulfonic acid film. FIG. 14A is a 200 micrometers. FIG. 14B is at 40 micrometers.

FIG. 15 is a graph of the resistance in ohms of polyaniline/polyvinylsulfonic acid as a function of gate potential, $V_G$, (in volts versus SCE), between two adjacent micro-electrodes.

FIG. 16 shows four plots of coulomb efficiency and capacity of various polyaniline/polyvinylsulfonic acid electrodes as a function of charge-discharge currently density in 1M sulfuric acid. FIG. 16A is coulomb efficiency of a various half cell batteries. FIG. 16B is the capacity of various half cell batteries. FIG. 16C is coulomb efficiency of zinc as an anode. FIG. 16D is the capacity of zinc as an anode.

FIG. 17 shows typical cyclic voltammograms of polyaniline/trifluoromethanesulfonic acid. FIG. 17A is the voltammogram during polymerization in 0.1M aniline and 1M trifluoromethanesulfonic acid. FIG. 17B is the cyclic voltammogram of polyaniline/trifluoromethanesulfonic acid film in aqueous 0.5M sulfuric acid at pH 1.2.

FIG. 18 are photographs of scanning electron micrographs of polyaniline/trifluoromethanesulfonic acid film. FIG. 18A is at 200 micrometers. FIG. 18B is at 40 micrometers.

FIG. 19 shows a plot of the resistance in ohms of polyaniline/trifluoromethanesulfonic acid as a function of gate potential $V_G$, between two adjacent micro-electrodes.

FIG. 20 shows graphs of coulomb efficiency and capacity of various polyaniline/trifluoromethanesulfonic acid electrodes as a function of charge-discharge current in 2M zinc sulfate. FIG. 20A is a graph of the coulomb efficiency, half cell battery. FIG. 20B is a graph of the capacity, half cell battery. FIG. 20C is a graph of the coulomb efficiency, zinc as an electrode. FIG. 20D is a graph of the capacity having zinc as anode.

FIGS. 21A, 21B, 21C and 21D show plots of accelerated stability tests for four self-doped polyaniline electrodes, PAN/Bs, PAN/PVSA, PAN/Ts, and PAN/TFMSA.

FIGS. 22A and 22B show graphs of long term charge/discharge curves at + or −15 mA/cm$^2$ in 1M ZnSO$_4$ (pH 2.3) with a zinc anode.

FIG. 23 shows a graph of the open circuit voltage as a function of time for self-doped polyaniline-zinc batteries.

FIGS. 24A, 24B, 24C and 24D show photographs of the surface morphology of two self-doped polyanilines PAN/TFMSA and PAN/Ts at 200 μm and 40 μm.

FIGS. 25A, 25B, 25C and 25D show photographs of the surface morphology of two self-doped polyanilines PAN/PVSA and PAN/Bs at 200 μm and 40 μm.

DETAILED DESCRIPTION OF THE INVENTION AND PREFERRED EMBODIMENTS

Definitions

As used herein

"Aliphatic dopant" refers to aliphatic, unsaturated, cyclic, bridged and/or fluorine substituted organic compounds having from 1 to 20 carbon atoms, preferably having from 1 to 12 carbon atoms, and more preferably having from 1 to 6 carbon atoms.

"Aromatic dopant" refers to those organic compounds which have a 5, 6, or 7 membered aromatic (e.g., benzene, toluene, naphatalene, chlorobenzene, nitrobenzene, and the like) or heteroaromatic (e.g., pyrrole, pyridine, quinoline and the like) sulfonic acid compounds. Aromatic compounds are preferred.

"Organic dopant" refers to aliphatic unsaturated, cyclic, bridged, aromatic heteroaromatic organic sulfonic acids (—SO$_3$H), acid chlorides (—SO$_2$Cl), or alkali salts (—SO$_3$M, wherein M is, for example, sodium or potassium). Organic means that at least one carbon atom is present, e.g. trifluoromethanesulfonic acid.

The present invention is an almost all polymer solid state battery comprising a permanently-doped polyaniline polymeric cathode (e.g., polyaniline/dopant), an optical solid polymer (e.g. NAFION film) and a zinc anode (e.g., zinc microparticles dispersed in a NAFION film). FIG. 1 schematically represents the rechargeable polymer battery. A major advantage of using a permanently-doped polyaniline cathode is that it requires only the hydrogen ions be incorporated and expelled during the discharge/charge cycle, because the negative charge sites, i.e., anions are designed to be immobilized in the polyaniline polymer matrix. In the discussion below, the polyaniline-dopant copolymer produced has a number of different forms. In a preferred embodiment, a substantially smooth polymer is formed which is useful in electrical transmission and/or storage, e.g., as a battery electrode. In another embodiment, a "flakey" type of product is obtained. This flakey material is useful to conduct or store electricity after it is pressed into a wire or pellet form using heat and/or pressure methods which are conventional in the art.

P-Toluenesulfonic Acid Dopant and Polyaniline

Comparison of Self-Doped Polyaniline/Tosylate (Toluenesulfonic Acid) and Conventional Polyaniline made with Sulfuric Acid—The polyaniline/tosylate polymer is synthesized electrochemically in an aqueous solution containing about 0.1M aniline and about 1M tosylate (p-toluenesulfonic acid), which produces a pH=0.65, using a potential-cycling method, from −0.2 V to +0.8 V at a rate of 0.1 V/second for 5.5 hours. FIG. 2A compares the resistance of various conventional polyaniline films as a function of the applied potential measured using an interdigitated microelectrode array. FIG. 2B has the surprising feature in that the permanently doped polyaniline/tosylate polymer is much more conductive (of the order of about 1 to 100 S/cm). The residual electrical properties are seen in FIG. 2B in the region of about 0.6 to 1.3 volts. FIG. 3B shows a typical cyclic voltammogram (CV) during the polymerization. Unlike the relatively featureless polymerization CV curve of a polyaniline made from 0.1M aniline and 0.1M $H_2SO_4$, shown in FIG. 3A, polyaniline/tosylate shows an additional redox peak about 0.2 V, which is due to the oxidation of polyaniline by the incorporation of tosylate, i.e. $SO_3^-$ group. The presence of the sulfonic groups ($SO_3^-$) within the polyaniline/tosylate polymer system was also confirmed by an EDAX analysis, which showed the presence of a large amount of elemental sulfur (see FIG. 4). FIGS. 3C and 3D compare cyclic voltammograms of 0.5M $Na_2SO_4$ of the two grown films. While the polyaniline/tosylate system shows a mostly featureless CV curve, however, with a large double-layer charging current (more than 50 mA/cm$^2$) (FIG. 3D), the polyaniline/$H_2SO_4$ shows an additional peak around 0.3 V that is due to the conventional anion doping (FIG. 3C). FIG. 5 shows the morphology of the self-doped polyaniline/tosylate polymer. The surface exhibits an ultrafine microstructure with a highly electroactive surface, which accounts for the observed high electrochemical capacitance.

The polyaniline/tosylate film is chemically more stable than conventionally made polyanilines. Indeed, FIG. 6A demonstrates that the Zn polyaniline/tosylate polymer battery shows no sign of degradation after 400 charge/discharge cycles at ±10 mA/cm$^2$, while the conventional polyaniline made in $H_2SO_4$ using the same potential-cycling method shows a degraded performance after only 50 cycles in about 6,000 seconds, FIG. 6B.

The charge/discharge reaction of the polyaniline/tosylate polymer electrode may be written as:

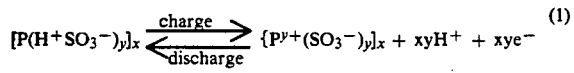

$$[P(H^+SO_3^-)_y]_x \xrightleftharpoons[\text{discharge}]{\text{charge}} \{P^{y+}(SO_3^-)_y\}_x + xyH^+ + xye^- \quad (1)$$

where P denotes polyaniline. In the mechanism proposed in Eq. (1), only small H$^+$ ions are mobile, because the mechanism assumes that tosylates containing $SO_3^-$ groups are immobilized in the polymer chains. This immobilization results in a more reversible electrode kinetics, better chemical stability, and a higher energy density than the conventional polyaniline electrodes, in which anions must diffuse in and out during a charge/discharge process, imparting some mechanical stress to the polymer film. Moreover, the mechanism of Eq. (1) should allow the use of a solid polymer electrolyte, e.g. Nafion, which provides better chemical stability, less resistance (especially when a thin film is used), and is easier to handle than the conventional organic and aqueous electrolytes.

Table 1 above summarizes typical performance characteristics of different polyaniline electrodes reported in the literature as well as the present polyaniline/tosylate polymer. It is misleading, however, to directly compare data from different laboratories because there may be many differences in fabrications, operations, and evaluation of batteries (for example, the weight of the present polyaniline electrode includes the weight of a considerable amount of water because the polyaniline is not removed from the electrode substrate).

Exhibit 1
DEFINITION OF
SOME IMPORTANT BATTERY PARAMETERS (a) Dopant Concentration y (%)
$y = 100\, QM/FW \times 10^{-3}$
$= 96\, Q/W\, (\%)$
where W (mg) is the weight of a polyaniline electrode, Q (coulomb) is the total charge involved, M (g/mol) is the molecular weight (92 for $C_6H_4NH$), and F (coulomb/mol) is Faraday's constant (9.65 × 10$^4$).
(b) Power Density $P_{max}$ (kW/kg)
$P_{max} = V_{oc} \times I_{ac}/(4 \times \times 10^{-3})$
where $V_{oc}$ is open-circuit cell voltage and $L_{sc}$ is short-circuit current.
(c) Energy Density, $E_{out}$ (Wh/kg); Capacity $Q_{total,out}$ (Ah/kg)
$E_{out} = V_d \times Q_{total,out}/W \times 10^{-3}$
where $V_d$ is the cell voltage during discharge. The charging input energy is given by:
$E_{in} = V_c \times Q_{total,in}/W \times 10^{-3}$
where $V_c$ is the cell voltage during charge.
(d) Energy Efficiency ($\eta_{Wh}$); Coulomb Efficiency ($\eta_{Ah}$)
Energy efficiency: $\eta_{Wh} = E_{out}/E_{in}$
Coulomb efficiency: $\eta_{Ah} = Q_{total,out}/Q_{total,in}$ Some important battery performance parameters are defined in Exhibit 1. The data indicate that the performance (e.g. capacity and energy density) of the polyaniline-polymer/Zn battery is already comparable to that of a typical lead-acid battery. However, in comparison with batteries made using polyaniline/$H_2SO_4$ films, it is clear that the performance of the polyaniline/tosylate/zinc battery is nearly comparable in terms of capacity, energy density, and self-discharge rate. The relatively low energy density and capacity observed with the polyaniline/tosylate is attributed to the relatively heavy weight of tosylate (FW 172).

POLYMERIZATION CONDITIONS FOR THE POLYANILINE/TOSYLATE

1. Solution Temperature During Polymerization

The effect of the solution temperature during polymerization (20°, 30°, and 40° C.) is examined. The results are summarized in Table 2. For comparison, the performance of the conventional polyaniline polymer electrode made with $H_2SO_4$ is presented.

As the solution temperature increases, the kinetics of the electrochemical polymerization for the aniline/tosylate becomes faster, and less time is required to grow the films. However, increasing the solution temperature also encourages the chemical reaction, which competes with the electrochemical polymerization reaction, to form an insulating film. When the solution temperature is 40° C., a very flaxy polymer film is formed, PAN 85, which results in a degraded battery performance. Among the three polyaniline/tosylate polymer electrodes studied, the best result in terms of change capacity is obtained when the solution temperature is room temperature, i.e. 20° C. (PAN 83); however, the coulomb efficiency (about 60 percent) is poorer than that of the conventional polyaniline electrode at the low current density of ±2 mA/cm$^2$.

TABLE 2

SUMMARY OF EFFECT OF THE SOLUTION TEMPERATURE DURING
POLYMERIZATION ON THE HALF-CELL BATTER PERFORMANCE$^a$
OF THE POLYANILINE/TOSYLATE ELECTRODES
AT ±2 mA/cm$^2$

|  | PAN 86 | PAN 83 | PAN 81 | PAN 85 |
| --- | --- | --- | --- | --- |
| Electrode substrate | 3D fat posts | 3D fat posts | 3D fat posts | 3D fat posts |

TABLE 2-continued
SUMMARY OF EFFECT OF THE SOLUTION TEMPERATURE DURING
POLYMERIZATION ON THE HALF-CELL BATTER PERFORMANCE[a]
OF THE POLYANILINE/TOSYLATE ELECTRODES
AT ±2 mA/cm²

|  | PAN 86 | PAN 83 | PAN 81 | PAN 85 |
|---|---|---|---|---|
| Starting materials | 0.1 M aniline | 0.1 M aniline | 0.1 M aniline | 0.1 M aniline |
|  | 0.1 M $H_2SO_4$ | 1 M tosylate | 1 M tosylate | 1 M tosylate |
| Solution pH | 1.4 | 0.65 | 0.65 | 0.65 |
| Solution temperature (°C) | 20 | 20 | 30 | 40 |
| Preparation method | $PC^b$ | $PC^b$ | $PC^b$ | $PC^b$ |
| Total coulombs | 4 hr., 2.4 C | 4 hr., 18 C | 4 hr., 23.4 C | 0.75 hr., 18 C |
| Weight (mg) | 0.6 | 18.3 | 24.3 | $11.8^c$ |
| $V_{oc}$ (V) | 0.46 | 0.43 | 0.45 | 0.39 |
| $I_{oc}$ (mA/cm²) | 0.04 | 0.02 | 0.13 | 0.07 |
| Capacity (Ah/kg) | 74.1 | 21.8 | 17.1 | 16.5 |
| Coulomb eff. (%) | 94 | 59 | 52 | 82 |
| $E_{out}$ (Wh/kg) | 35.8 | 10.8 | 8.3 | 8.4 |

[a]Half-cell battery test was performed in 1 M $ZnSO_4$ (pH 2.3) by cycling potential between 0.35 V and 0.8 V vs. SCE at a constant charge-discharge rate of ±2 mA/cm².
[b]Potential cycled at 100 mV/sec between −0.2 and +0.8 V vs. SCE.
[c]Film was flaky and loose, some material lost during rinsing after polymerization.

The coulomb efficiency of the polyaniline/tosylate polymer electrodes improves dramatically as the charge-discharge current density increases, reach almost 100 percent at ±10 to ±20 mA/cm² [see FIG. 7B]. Moreover, the charge capacity of the polyaniline/tosylate electrodes remain relatively unchanged with an increase of the current density, while the capacity of the conventional polyaniline electrode quickly degrades [see FIG. 7A]. This indicates that the polyaniline/tosylate electrodes are chemically more stable, presumably because the fixed anion ($SO_3^-$) sites allow $H^+$ ions to be primarily mobile ions during the charge-discharge process, forming a useful cathode in an aqueous, high-current-density polymer battery.

ELECTROPOLYMERIZATION

The electrochemical polymerization method (potential-cycling method vs. constant voltage method) as well as the effect of pretreatment (cycling potential in 0.1 M $H_2SO_4$ prior to the testing) is summarized in Table 4.

The polyaniline/tosylate prepared by applying a constant potential of 0.7 vs SCE (PAN 103) exhibits fair performance (Table 5). When the potential is increased to 0.8 V, the resulting film is very powdery and peels off as soon as it is blown dry. When a constant potential of 0.65 V is used, the film takes a long time to grow, and the battery perforance is not very good (PAN 104). The best results are obtained when the films grown by the potential-cycling method are pretreated by cycling between −0.2 V and 0.8 V at 100 mV/second in 0.2 M $H_2SO_4$ for 2 hours (PAN 99). Pretreatment improves the half-cell battery performance by about 50 percent over the previous data (e.g. PAN 95); capacity and energy density became −40 Ah/kg and about 20 Wh/kg, respectively. This improvement is likely due to leaching out of the excess of tosylate ions, which are not incorporated into the polyaniline matrix reducing the effective weight of the electrode. No further improvement is observed when the pretreatment was continued for 12 hours (PAN 100).

TABLE 4
SUMMARY OF EFFECT OF THE COMPOSITION
OF THE STARTING POLYMERIZATION SOLUTION
ON THE HALF-CELL BATTERY PERFORMANCE[a]
OF THE POLYANILINE/TOSYLATE ELECTRODE AT ±2 mA/cm²

|  | PAN 96 | PAN 93 | PAN 92 | PAN 95 |
|---|---|---|---|---|
| Electrode substrate | flat | flat | 3D flat | flat |
| Starting materials | 0.05 M aniline | 0.1 M aniline | 0.2 M aniline | 0.2 M aniline |
|  | 1 M tosylate | 1 M tosylate | 1 M tosylate | 0.8 M tosylate |
| Solution pH | 0.65 | 0.65 | 0.65 | 1.1 |
| Solution temperature (°C) | 20 | 20 | 20 | 20 |
| Preparation method | $PC^b$ | $PC^b$ | $PC^b$ | $PC^b$ |
| Total coulombs | 12 hr, 6.1 C | 4 hr, 3.7 C | 6.5 hr, 7.0 C | 4 hr, 3.2 C |
| Weight (mg) | 8.4 | 3.9 | 6.4 | 2.9 |
| $V_{oc}$ (V) | 0.43 | 0.43 | $0.03^c$ | 0.45 |
| $I_{sc}$ (mA/cm²) | 0.46 | 0.76 | 0.3 | 0.13 |
| Capacity (Ah/kg) | 17.9 | 24.9 | 25.1 | 26.8 |
| Coulomb eff. (%) | 87 | 86 | 93 | 90 |
| $E_{out}$ (Wh/kg) | 9.1 | 12.7 | 12.6 | 13.1 |

[a]Half-cell battery test was performed in 1 M $ZnSO_4$ (pH 2.3) by cycling potential between 0.35 V and 0.8 V vs. SCE at a constant charge-discharge rate of ±2 mA/cm².
[b]Potential cycle at 100 mV/sec between −0.2 V and +0.8 V vs. SEC.
[c]The film partly peeled off.

TABLE 5

SUMMARY OF EFFECT OF ELECTROCHEMICAL POLYMERIZATION METHOD AND PRETREATMENT ON THE HALF-CELL BATTERY PERFORMANCE[a] OF THE POLYANILINE/TOSYLATE ELECTRODE AT ±2 mA/cm²

|  | PAN 103 | PAN 104 | PAN 99 | PAN 100 |
|---|---|---|---|---|
| Electrode substrate | flat | flat | flat | flat |
| Starting materials | 0.2 M aniline | 0.2 M aniline | 0.1 M aniline | 0.1 M aniline |
|  | 0.8 M tosylate | 0.8 M tosylate | 1 M tosylate | 1 M tosylate |
| Solution pH | 1.1 | 1.1 | 0.65 | 0.65 |
| Solution temperature (°C.) | 20 | 20 | 20 | 20 |
| Preparation method | 0.7 V for 0.5 hr | 0.65 V for 4 hr | PC[b] for 4 hr | PCV[b] for 4 hr |
| Total coulombs (C) | 4 | 4 | 4.1 | 4.1 |
| Weight (mg) | 2.7 | 3.5 | 4.7 | 4.5 |
| Pretreatment | — | — | 2 hr[c] | 12 hr[c] |
| Capacity (Ah/kg) | 29.1 | 17.1 | 38.4 | 40.3 |
| Coulomb eff. (%) | 93 | 96 | 96 | 87 |
| $E_{out}$ (Wh/kg) | 14.8 | 8.2 | 19.4 | 19.7 |

[a]Half-cell battery test was performed in 1 M ZnSO₄ (pH 2.3) by cycling potential between 0.35 V and 0.8 V vs. SCE at a constant charge-discharge rate of ±2 mA/cm².
[b]Potential cycle at 100 mV/sec between −0.2 V and +0.8 V vs. SCE.
[c]Cycled in 0.1 M H₂SO₄.

The most striking feature of the polyaniline/tosylate polymer films is that, in addition to being highly conductive, they exhibit a second conductive region (permanently conductive), which extends to a higher potential region, up to 1.5 V. This also means that the polyaniline/tosylate films are chemically more stable than conventionally made polyanilines. The unique resistance vs. voltage characteristics of the polyaniline/tosylate is also used to design new molecular electronic devices such as an organic transistor and memory device.

In another preferred embodiment, the polymer is produced under the following conditions wherein the aniline is at a starting concentration of about 0.1M, the p-toluensesulfonic acid is at a starting concentration of about 1M, the potential range is between about −0.1 and +0.9 V versus SCE, the scan rate is about 0.1V per second, the total coulomb is about 1.1, and the time is about 15 minutes.

In a preferred embodiment the polymer is prepared wherein the aniline is at a starting concentration of about 0.1M, the p-tolunesulfonic acid is at a concentration of about 1M, the potential range is between about −0.2 and +0.8 V versus SCE, the scan rate is about 0.1 V per second, and the total coulombs is 6.0 and the time is about 6.5 hours.

In another preferred embodiment, the self-doped polyaniline is produced having about a 0.1M starting concentration of aniline and about 1M p-toluenesulfonic acid, a potential range of between about −0.2 and +0.8 volts versus SCE and a scan rate of about 0.1 volt per second. The produced polymer is a function of time and the size of the electrode. In a more preferred embodiment of the above reaction conditions, the time is 3 hr. and the total coulomb is 6.1.

In a more preferred embodiment, the self-doped polyanine is produced having about a 0.1M starting concentration of aniline and 1M starting concentration of aniline and 1M benzenesulfonic acid, a potential range of between about −0.1 to +0.9 volts versus SCE, and a scan rate of about 0.1 volts per second. The thickness of the produced polymer is a function of time and size of the electrode. In a more preferred embodiment of the above reaction conditions, the time is 1 hr. and the total coulomb is 5.5.

In a preferred embodiment the self-doped polyaniline is produced having a starting aniline concentration of 0.1M, a 12.5 percent by volume starting polyvinylsulfonic acid concentration, a potential range of between about −0.2 to +0.8 V (versus SCE) and a scan rate of about 0.1 V per second. The thickness of the polymer is a function of the time of reaction and size of the electrode. In a more preferred embodiment of the above conditions, the time is for about 16 hr. and a total coulomb is 5.4.

In a preferred embodiment, the self-doped polyaniline is produced having about a 0.1M starting concentration of aniline, a 1M starting concentration of trifluoromethane-sulfonic acid, a potential range of about −0.1 to +0.9 versus SCE and a scan rate of 0.1 V per second. The thickness of the polymer is a function of the time and the size of the electrode. In a more preferred embodiment of the above conditions, the time is about 2.5 hr. and the total coulomb is about 6.1.

The Nafion-Polyaniline/Tosylate Composite Electrodes

A major problem to be overcome in the development of an aqueous, large-current polymer battery is the loss of the stored charge through a self-discharging process. As summarized in Table 6, self-discharging (i.e. the coulomb efficiency decreases as the rest time increases) was observed for both a conventional polyaniline polymer electrode made in H₂SO₄ (PAN 86) and a polyaniline/tosylate polymer electrode (PAN 73).

TABLE 6

COULOMB EFFICIENCY OF THREE ELECTRODE MATERIALS AS A FUNCTION OF REST TIME*
(Percent)

|  | Polyaniline/H₂SO₄ (conventional) | | Polyaniline/Tosylate | | | Nafion/Polyaniline/Tosylate | | |
|---|---|---|---|---|---|---|---|---|
|  | PAN 86[b] | PAN 86 | PAN 73[a] | PAN 73 | PAN 108[d] | PAN 105 | PAN 106 | PAN 107 |
| Electrolyte (1M) | Tosylate | ZnSO₄ | Tosylate | ZnSO₄ | | | ZnSO₄ | |
| Rest Time(s) | | | | | | | | |
| 0 | 93 | 99 | 84 | 79 | 89 | 90 | 97 | 99 |
| 10 | 93 | 98 | — | — | 87 | 94 | 99 | 97 |

TABLE 6-continued

COULOMB EFFICIENCY OF THREE ELECTRODE MATERIALS
AS A FUNCTION OF REST TIME*
(Percent)

|  | Polyaniline/H$_2$SO$_4$ (conventional) | | Polyaniline/Tosylate | | | Nafion/Polyaniline/Tosylate | | |
| --- | --- | --- | --- | --- | --- | --- | --- | --- |
|  | PAN 86[b] | PAN 86 | PAN 73[a] | PAN 73 | PAN 108[d] | PAN 105 | PAN 106 | PAN 107 |
| 100 | 86 | 87 | 83 | 80 | 79 | 84 | 89 | 86 |
| 1000 | 63 | 65 | 64 | 68 | 49 | 59 | 72 | 67 |

*The electrode was first charged with +2 mA/cm$^2$ until the electrode potential reached 0.8 V; the electrode was kept unbiased for a certain time as indicated as the rest time. Then, the electrode was discharged with −2 mA/cm$^2$ until the potential became 0.35 V.
[b]Conventional polyaniline electrode.
[c]Standard polyaniline/tosylate electrode: 0.1 M aniline/1 M tosylate by the potential-cycling method.
[d]Starting solution: 2 M aniline/0.8 M tosylate (pH adjusted to 0.7 by H$_2$SO$_4$), prepared by the potential-cycling method.

RESISTANCE MEASUREMENTS USING AN INTERDIGITATED MICROELECTRODE ARRAY

Using the interdigitated microelectrode array (gold or platinum) approach, the resistance of polyaniline films is measured that have different ratios of aniline to tosylate in the polymerization solution as a function of applied potential. The results are presented in FIG. 2 together with data obtained with the conventional polyanilines. Some minor difference in the magnitude of resistance is observed between the platinum electrode and the gold electrode, which is presumably due to the difference in the surface electrochemical properties of gold and platinum (e.g. surface oxide). The composition of 0.7 M tosylate and 0.3 M aniline failed to produce a stable film (PAN R3). The following is a summary:

The polyaniline/tosylate films are much more conductive (estimated conductivity is on the order of about 1 to 100 S/cm) than any previously made polyaniline films in the potential window for the conductive region of polyaniline (i.e. 0.1 to 0.6 V vs. SCE).

There is a permanently doped region in the potential range 0.8 to about 1.5 V in the polyaniline/tosylate films, while the conventional polyanilines show a transition from conductor to insulator at about 0.7 V and start to deteriorate upon application of a voltage greater than about 0.7 V.

The conductiveity of the polyaniline/tosylate films increases with an increase of the ratio to tosylate to aniline in the polymerization solution.

In an attempt to reduce the self-discharge problem, the composite system Nafion/polyaniline/tosylate is studied as a cathode battery electrode. Electrodes made by two methods are evaluated.

Method 1 - Polyaniline/tosylate is polymerized on a Nafion film-coated electrode.

Method 2 - A multilayer Nafion film is deposited on the polyaniline/tosylate electrode.

Several polyaniline/tosylate films are grown on a Nafion-coated electrode by the potential-cycling method (PAN 105) and by the constant-potential method (+0.65 and +0.7 V vs. SCE: PAN 106 and PAN 107). Also one electrode is prepared from a solution containing 0.2 M aniline and 0.8 M tosylate; its pH is adjusted to 0.7 (the same pH as the mixture of 0.1 M aniline and 1 M tosylate) by adding H$_2$SO$_4$ (PAN 108).

The results of coulomb efficiency vs. rest-time experiments presented in the righthand side of Table 6 indicate that Method 1 does not reduce the self-discharge problem. The resistance vs. voltage plots are presented in FIG. 8; the curves were almost identical for the polyaniline/tosylate polymer films with or without Nafion. The polyaniline/tosylate polymer film made from 0.2 M aniline and 0.8 M tosylate by the potential-cycling method became more conductive after being cycled in H$_2$SO$_4$ for 5.5 hours. The half-cell battery test results are summarized in Table 7. Smaller values of charge capacity and energy density were obtained when the polyaniline/tosylate was prepared in a Nafion film, because Nafion increases the electrode weight.

TABLE 7

SUMMARY OF THE HALF-CELL BATTERY PERFORMANCE[a] OF THE
NAFION/POLYANILINE/TOSYLATE ELECTRODES AT ±2 mA/cm$^2$

|  | PAN 105 | PAN 106 | PAN 107 | PAN 108 |
| --- | --- | --- | --- | --- |
| Electrode substrate | Nafion-coated flat | Nafion-coated flat | Nafion-coated flat | Nafion-coated flat |
| Starting materials | 0.2 M aniline 0.8 M tosylate | 0.2 M aniline 0.8 M tosylate | 0.2 M aniline 0.8 M tosylate | 0.2 M aniline 0.8 M tosylate |
| Solution pH | 1.1 | 1.1 | 1.1 | 0.7[b] |
| Solution temperature (°C.) | 20 | 20 | 20 | 20 |
| Preparation method | PC[c] for 3 hr | 0.65 V for 4 hr | 0.7 for 0.5 hr | PC[c] for 3.5 hr |
| Total coulombs (C) | 4 | 4 | 4 | 7 |
| Weight (mg) | 4.2 | 3.7 | 4.7 | 8.7 |
| Capacity (Ah/kg) | 18.2 | 13.2 | 7.4 | 13.3 |
| Coulomb eff. (%) | 90 | 96 | 99 | 90 |
| E$_{out}$ (WH/kg) | 7.1 | 5.9 | 3.3 | 6.4 |

[a]Half-cell battery test was performed in 1 M ZnSO$_4$ (pH 2.3) by cycling potential between 0.35 V and 0.8 V vs. SCE at a constant charge-discharge rate of ±2 mA/cm$^2$.
[b]Adjusted by H$_2$SO$_4$.
[c]Potential cycle at 100 mV/sec between −0.2 V and +0.8 V vs. SCE.

The best results in reducing the loss of battery capacity through self-discharging are obtained when a few layers if Nafion film were case on the already prepared polyaniline/tosylate polymer electrode. Successive Nafion films are deposited; each layer consisted of 50 μL/cm$^2$ of the 5:1 diluted pre-ion-exchanged Nafion solution. Table 7 summarizes the results. After the application of a single layer of Nafion, the loss of charge capacity through self-discharging is dramatically reduced for both the conventional polyaniline electrode and the polyaniline/tosylate electrode. Further addition of Nafion layers results in only slight improvement.

The following Examples are meant to be illustrative and descriptive only. They are not to be construed as being limiting in any way.

The chemicals and reagents are available in high purity reagent grade from chemical supply houses such as Aldrich Chemical of Milwaukee, Wis., Kodak, Rochester, N.Y. or those identified in *Chemical Sources, U.S.A.*, published annually by Directories Publishing, Inc., of Boca Ratan, Fla. Nafion is also available form Solution Technology, Inc. of Philadelphia, Pa.

EXAMPLE 1

Electropolymerization of Composition Ratios of Aniline/Tosylate (A) 1M Tosylate/0.5M aniline—1M tosylate solution is prepared. The solution is warmed to 30° C. by placing the beaker in a water bath and 0.5M aniline is added. Initially, the solution remains clear after a gentle agitation; however, gradually white precipitate starts to form by a direct chemical reaction between aniline and tosylate and eventually forms a hard lump.

(B) 0.5 Tosylate/0.5M aniline—The solution is prepared as above in step 1(A) (the pH of the 0.5M tosylate solution is 1.56); however, the solution stays clear in 30° C. water bath. The electrochemical polymerization is attempted on a 3D fat posts electrode (PAN 90 and 91). Initially, the polymerization reaction occurs normally; however, after about 10 to 15 minutes, the existing grown film starts to slow the polymerization process—the film appears to be very insulating—and finally, no further film growth is observed.

(C) 1M Tosylate/1.5M aniline—The Starting solution is clear but dark yellow. Polymerization (PAN 97) occurs initially, but the film becomes insulating as indicated by CV growth curve. Not much of the film is left after the experiment is terminated; the remaining film looks very loose and flaky and is washed away by rinsing with water.

(D) 1M Tosylate/0.3M aniline, 0.8 tosylate/0.3M aniline—As observed with the 1M tosylate/0.5M aniline case, precipitation occurs immediately and a lump forms.

Usable polymer films of polyaniline/tosylate are formed when the concentration range is limited to between about 0.8 and 1M for tosylate and between about 0.05 and 0.2M for aniline. The results of the half-cell battery test are summarized above in Table 4. No substantial difference in terms of the half-cell performance was observed when the concentration of aniline is increased from between about 0.1M and 0.2M or the concentration of tosylate is decreased from between about 1M to 0.8M. However, a low concentration of aniline, i.e. 0.05M, gives a poorer performance (PAN 96). A preferred concentration range is: aniline: 0.1M to 0.2M; tosylate: 0.8M to 1M.

EXAMPLE 2

Benzenesulfonic-Acid-Based Self-Doped Polyaniline

A number of benzenesulfonate-doped polyanilines (PAN/Bs) are electrochemically synthesized either on a platinum-sputtered plain ceramic electrode or a platinum-covered three-dimensional "fat post" electrode in an aqueous solution containing 0.1M aniline and 1M benzenesulfonic acid (Bs), which produces pH of 1.5.

Tables 8 and 9 below summarize the synthesis conditions in detail. A potential-cycling method is used for most of the synthesis attempts because the other electrochemical approaches (i.e., constant-potential method and constant-current method) does not yield any workable polymers. For example, when a constant potential of 0.8 V with respect to a saturated calomel electrode (vs. SCE) is applied, the resulting polymer film (PAN3016) is extremely loose and flaky. The "best" surface morphology is obtained when benzenesulfonic-acid-doped polyaniline is prepared by a potential-cycling method at a scan rate of 0.1 V/s cycled between −0.1 V to +0.9 V vs. SCE. No polymer growth is observed when the potential is cycled between −0.2 V to +0.8 V vs. SCE, which is the standard electrochemical window for the conventional polyaniline made from 0.1M aniline and 0.1M sulfuric acid.

FIG. 9A shows a typical cyclic voltammogram during the polymerization of the PAN/Bs. The polymerization process is fast (e.g., the current on the order of 50 mA/cm$^2$ is involved after only 90 cycles of the polymerization), indicating that the PAN/Bs film is very conductive. As observed with the polyaniline/tosylate (PAN/Ts), an additional redox peak is seen about 0.2 V, which results from the oxidation of polyaniline by the incorporation of benzenesulfonic acid, i.e., SO$_3^-$ group. The presence of the sulfonic groups within the polyaniline/benzenesulfonate is confirmed by an EDAX analysis, which showed the presence of a large amount of elemental sulfur. FIG. 9B illustrates a typical cyclic voltammogram of grown PAN/Bs film in 0.5M Na$_2$SO$_4$ aqueous solution, which shows a mostly featureless curve mostly consisting of a large double-layer charge-discharge current.

FIG. 10 shows a typical surface morphology of the self-doped PAN/Bs at 40 and 200 micrometer scale prepared by the potential cycling method. The surface exhibits a very rough, powdery thick film with many cracks. The grown films are very loose and flaky, which makes it difficult to conduct further characterization study of the films. It is impossible to dry the films in a desiccator because the polymer turns into powder when the surface is completely dried. Several attempts were made to improve the quality of the PAN/Bs films prepared by potential cycling method (see Table 9). In particular, several slower potential scan rates (i.e 20, 50 and 75 mV/s) and a higher aniline-to-Bs ratio (i.e., 0.2M aniline and 1M Bs) were attempted. Not one of the polymer films produced better morphology than those prepared form 0.1M aniline and 1M Bs at a scan rate of 100 mV/s.

FIG. 11 presents the resistance measurements using the interdigitated microelectrode array method developed. The shape of the resistance versus potential plot is similiar to that observed with PAN/Ts in that, besides being more conductive than the conventional PAN films, there is a permanently conductive region in the potential range of 0.8 to 1.5 V.

The battery performance characteristics of some of the PAN/Bs electrodes are evaluated after a thin layer of Nafion solution (50 μL of 5:1 diluted Nafion solution which produces an approximately 1-μm thick Nafion film after dried) is deposited onto the surface of each electrode immediately following polymerization. FIG. 12 shows the coulomb efficiency and capacity of electrode PAN3016 as a function of charge-discharge current density. The half-cell battery performance is evaluated in 1M ZnSO$_4$ (pH 2.3) by cycling potential between 0.35 V and 0.8 V vs. SCE at a constant charge-discharge rate using a platinum counter electrode. The complete battery performance using a zinc sheet as anode is measured by cycling cell voltage between 1.7 and 1.35 vs. SCE.

TABLE 8

ELECTROCHEMICAL SYNTHESIS CONDITIONS FOR BENZENESULFONIC-ACID-BASED SELF-DOPED POLYANILINES
Unless otherwise noted, all electrodes planar platinium on ceramic substrate.

| Electrode | Preparation Method | Total Coulomb | Morphology |
|---|---|---|---|
| PAN3003 | 0.1 M aniline/1 M Bs*: Potential cycling, $0 \rightleftharpoons +1$ V, 75 mV/s | 0.7 h, 8.3 C | Flaky |
| PAN3004 | 0.1 M aniline/1 M Bs*: Potential cycling, $0 \rightleftharpoons +1$ V, 50 mV/s | 0.3 h, 5.4 C | Flaky |
| PAN3005 | 0.1 M aniline/1 M Bs*: Potential cycling, $0 \rightleftharpoons 1$ V, 50 mV/s | 0.7 h, 6.8 C | Flaky |
| PAN3006 | 0.1 M aniline/1 M Bs*: Potential cycling, $0 \rightleftharpoons 1$ V, 20 mV/s | 0.8 h, 4.2 C | Flaky |
| PAN3007 | 0.1 M aniline/1 M Bs*: Potential cycling, $0 \rightleftharpoons 1$ V, 20 mV/s | 0.9 h, 4.0 C | Flaky |
| PAN3008 | 0.2 M aniline/1 M Bx: Potential cycling, $-0.2 \rightleftharpoons +0.8$ V, 100 mV/s | 1.7 h, 3.0 C | Flaky |
| PAN3009 | 0.2 M aniline/1 M Bs* with Nafion: Potential cycling, $-0.2 \rightleftharpoons +0.8$ V, 100 mV/s | 1.3 h, 0.13 C | Flaky |

*Bs: Benzenesulfonic acid
All the potential values reported are with respect to SCE (saturated calomel electrode).

TABLE 9

ELECTROCHEMICAL SYNTHESIS CONDITIONS AND BATTERY PERFORMANCE OF BENZENESULFOIC-ACID-BASED SELF-DOPED POLYANILINES
Unless otherwise noted, all electrodes planar platinum on ceramic substrate

| Electrode | Preparation Method | Total Coulomb | Weight (mg) | Coulomb Efficiency (%) | Capacity (Ah/kg) |
|---|---|---|---|---|---|
| PAN3010 | 0.1 M aniline/1 M Bs*: Constant current, 0.1 mA/cm$^2$ | 4 h, 0.6 C | | | |
| PAN3011 | 0.1 M aniline/1 M Bs*: Constant potential, +0.8 V | 0.2 h, 5.0 C | | | |
| PAN3012 | 0.1 M aniline/1 M Bs*: Constant potential, +0.7 V | 0.5 h, 7.35 C | | | |
| PAN3013 | 0.1 M aniline/1 M Bs*: Potential cycling, $-0.1 \rightleftharpoons +0.9$ V, 100 mV/s | 1.5 h, 6.2 C | 19.4 | 100 | 3.92 |
| PAN3014 | 0.1 M aniline/1 M Bs*: Potential cycling, $-0.1 \rightleftharpoons +0.9$ V, 100 mV/s | 2.5 h, 2.7 C | 2.5 | | |
| PAN3015 | 0.1 M aniline/1 M Bs*: Potential cycling, $-0.1 \rightleftharpoons +0.9$ V, 100 mV/s | 1.5 h, 9.8 C | 21.1 | 100 | 4.47 |
| PAN3016 | 0.1 M aniline/1 M Bs*: Constant potential, +0.8 V | 1 h, 28.8 C | 72.5 | 99 | 2.66 |

*Bs: Benzenesulfonic acid
30 μl of 3:1 MEW Nafion solution deposited immediately after polymerization
Working electrode with platinum black
"Old Coco" platinum electrode cially available polyvinylsulfonate sodium salt in an ion-exchange column. The exchange column used is Amberlite IR-120 plus ion exchange resin (Polyscience, Inc.) The ion exchange procedure is as follows:

(1) The ion exchange resins are packed and washed with 6M HCl solution, followed by rinsing with deionized water before use. This preconditioning process ensures that the ion exchange resins are the desired ionic formula.

(2) 25 mL of polyvinylsulfonate sodium salt solution (pH 9.5) is passed through the exchange column at a slow flow rate (approximately 15 mL/hour). The pH of the filtrate, i.e. polyvinylsulfonic acid, should be about 1.5.

(3) Rinse the ion exchange resins with deionized water until all the polyvinylsulfonates have pass through the exchange column, i.e., until the pH of the filtrate becomes neutral.

(4) The exchanged column is rejuvenated by washing with 30 mL of 6M HCl solution at same slow flow rate. The excess HCl is then rinsed off with deionized water.

(5) The polyvinylsulfonic acid produced in Step (2) is passed through the exchange column one more time to ensure the complete ion exchange process [repeat Step (2) above].

(6) Double the volume of the prepared polyvinylsulfonic acid by adding deionized water so that the actual concentration of the acid becomes one-half of the concentration of the stock solution (i.e., 12.5% in water).

2. Polymerization and Results

The polyaniline/polyvinylsulfonates (PAN/PVSA)

EXAMPLE 3

Polyvinylsulfonic-acid-based-self-doped Polyaniline

1. Preparation of Polyvinylsulfonic Acid

The starting polymer used is polyvinylsulfonate sodium salt (Polyscience Inc., 25% in water, MW 2000). Polyvinylsulfonic acid is prepared by washing commerare prepared electrochemically in an aqueous solution containing 0.1M aniline and 12.5% polyvinylsulfonic acid (pH=1.5) either on the planar platinum sputtered ceramic electrode or on the three-dimensional fat post electrode. Several electrodes are made by different electrochemical polymerization methods (see Table 10)

and characterized for the battery application. The polymer films prepared by the potential cycling method with a standard electrochemical window of −0.2 V to +0.8 V vs. SCE exhibits the most uniform surface structure.

TABLE 10

ELECTROCHEMICAL SYNTHESIS CONDITIONS FOR POLYVINYLSULFONIC-ACID SELF-DOPED POLYANILINES

| Electrode | Preparation Method | Total Coulomb | Weight (mg) |
|---|---|---|---|
| PAN3017* | 0.1 M aniline/12.5% PVSA : Potential cycling, −0.2 ⇌ +0.8 V, 100 mV/s | 2 h, 2.2 C | |
| PAN3018 | 0.1 M aniline/12.5% PVSA : Potential cycling, −0.2 ⇌ +0.8 V, 100 mV/s | 1 h, 3.6 C | 2.7 |
| PAN3019 | 0.1 M aniline/12.5% PVSA : Constant current, 1 mA/cm$^2$ | 1 h, 3.6 C | 0.9 |
| PAN3020 | 0.1 M aniline/12.5% PVSA : Constant potential, +0.8 V | 0.3 h, 6.3 C | 1.2 |
| PAN3021 | 0.1 M aniline/12.5% PVSA : Potential cycling, −0.2 ⇌ +0.8 V, 100 mV/s | 64 h, 7.6 C | 3.3 |

*Planar sputtered ceramic electrode
PVSA; Polyvinylsulfonic acid
Three-dimensional "fat post" electrode FIGS. 13A and 13B show a typical cyclic voltammogram of the PAN/PVSA during the polymerization, and a cyclic voltammogram of the grown film in 0.5 M Na$_2$SO$_4$ solution. These CV curves show the characteristic features of the self-doped polyaniline observed with the PAN/Ts and PAN/Bs. The presence of the sulfonic group (−SO$_3^−$) is confirmed by the large sulfur peak observed in an EDAX analysis. Unlike the PAN/Bs film, the PAN/PVSA exhibits a surface morphology at 200 and 40 micrometer scale. (See FIG. 14) which is similar to that of PAN/Ts, i.e. an ultrafine microstructure with a highly electroactive surface, which makes the film attractive for the battery application.

The results of the residence measurements of the PAN/PVSA using the interdigitated microelectrode array method are presented in FIG. 15. The PAN/PVSA films are more conductive that the conventional PAN/H$_2$SO$_4$; however, they are more resistive than the other self-doped polyaniline films (PAN/Ts and PAN/Bs). FIGS. 16A and 16B illustrate the coulomb efficiency and capacity of various PAN/PVSA electrodes as a function of charge/discharge current density for both half-cell battery and complete batter (zinc as anode). Generally speaking, the battery performance of the PAN/PVSA electrodes are comparable is comparable to that of the PAN/tosylate electrodes.

EXAMPLE 4

Trifluoromethanesulfonic-acid-based Self-doped Polyaniline

The polyaniline/trifluoromethanesulfonates are electrochemically polymerized in an aqueous solution containing 1M trifluoromethanesulfonic acid (TFMSA) and 0.1M aniline either on the planar platinum sputtered ceramic electrode or on the three-dimensional fat post electrode. The 1M TFMSA solution (pH=1.15) is prepared form 98% stock solution (Chemical Dynamics Corporation). Several PAN/TFMSA electrodes are mostly prepared by the potential cycling method (see Table 11), because the potential cycling method produces the best polymer films. However, when the conventional electrochemical window for potential cycling (−0.2 to +0.8 V vs. SCE) is applied, the growth of films is extremely slow; therefore, the window is shifted to −0.1 to +0.9 V.

A sharp, well-defined redox peak is seen around 0.2 V vs. SCE in the cyclic voltammogram during the polymerization (FIG. 17A), indicating a smooth incorporation of sulfonic groups (−SO$_3$) into the film (the presence of a large sulfur peak is shown in an EDAX analysis). This observation is probably related to the fact that trifluoromethanesulfonic acid has a relatively low molecular weight of 150.07. The cyclic voltammogram of a grown film of PAN/TFMSA is 0.5Na$_2$SO$_4$ solution [FIG. 17B] is similar to that observed with PAN/Ts. Unfortunately, the morphology of the PAN/TFMSA (FIG. 18) exhibits a thick film with many cracks that is rough and brittle, although it is slightly more smooth than the PAN/Bs films.

The results of the resistance measurements of PAN/TFMSA electrodes made using the interdigitated microelectrode array method are shown in FIG. 19. The residual electrical properties are seen in FIG. 19 in the region of about 0.8 to 1.4 volts. The PAN/TFMSA films are more conductive than the conventional PAN/H$_2$SO$_4$ films, and the resistance vs. potential curves of PAN/TFMSA are almost identical to those obtained with PAN/Ts. FIG. 20 illustrates the coulomb efficiency and capacity of various PAN/TFMSA electrodes as a function of charge-discharge current density. The performance of these electrodes are comparable to that of the PAN/tosylate electrodes.

TABLE 11

ELECTROCHEMICAL SYNTHESIS CONDITIONS FOR TRIFLUOROMETHANESULFONIC-ACID SELF-DOPED POLYANILINES

| Electrode | Preparation Method | Total Coulomb | Weight (mg) |
|---|---|---|---|
| PAN3022* | 0.1 M aniline/1 M TFMSA : Potential cycling, −0.2 ⇌ +0.8 V, 100 mV/s | 18.5 h, 6.6 C | 1.9 |
| PAN 3023* | 0.1 M aniline/1 M TFMSA : Potential cycling, −0.1 ⇌ +0.9 V, 100 mV/s | 2.6 h, 5.1 C | 2.9 |
| PAN3024 | 0.1 M aniline/1 M TFMSA : Potential cycling, −0.1 ⇌ +0.9 V, 100 mV/S | 12 h, 14.6 C | 20.9 |
| PAN3025 | 0.1 M aniline/1 M TFMSA : Constant current, 0.2 mA/cm$^2$ | 9.5 h, 7.0 C | 8.1 |
| PAN3026* | 0.2 M aniline/1 M TFMSA : Potential cycling, −0.1 ⇌ +0.9 V, 100 mV/s | 1.5 h, 10.3 C | 16.2 |
| PAN3027 | 0.2 M aniline/1 M TFMSA : Potential cycling, −0.3 ⇌ +0.8 V, 100 mV/s | 25 h, 35.5 C | 6.7 |

*Planar platinum sputtered ceramic electrode
TFMSA: Trifluoromethanesulfonic acid
Three-dimensional "fat post" electrode

ACCELERATED STABILITY TESTS

Accelerated stability tests are conducted using a cyclic voltammetry technique for four polyaniline electrodes to identify the most chemically stable polyaniline-dopant electrode within a typical electrochemical window for the charge-discharge conditions:

Polyaniline/benzenesulfonic acid/Nafion [PAN/Bs/Nf]

Polyaniline/polyvinylsulfonic acid [PAN/PVSA]

Polyaniline/toluenesulfonic acid (tosylate) [PAN/Ts]

Polyaniline/trifluoromethanesulfonic acid [PAN/TFMSA]

In the case of polyaniline/benzenesulfonic acid, it is necessary to cover the polymer electrode with a Nafion film because the grown film is very loose and flaky.

FIG. 21 shows the results. The potential is cycled between +0.35 V to +0.8 V (vs. SCE) in 12M $ZnSO_4$ solution (pH 2.3); the scan rate is 20 mV/s and the cyclic voltammograms for cycles 100 and 100 are shown. There is hardly any change in shape of the two cyclic voltammogram curves for the PAN/Ts electrode and the PAN/TFMSA electrode, indicating that these electrodes are intrinsically stable. On the other hand, the PAN/Bs and the PAN/PVSA show considerable degradation after 100 cycles, which result in a substantial distortion in the cyclic voltammogram curves.

For a quantitative comparison, the current densities are calculated at +0.8V of cycle 10($I_{10}$) and cycle 100 ($I_{100}$). A normalized parameter, $I/I_{10}$, where $I=I_{10}-I_{100}$, is used to measure the stability of each electrode (see Table 12). Using this calculation, the stability decreases in the following sequence:

PAN/TFMSA > PAN/Ts >> PAN/Bs(w/Nf) > PAN/PVSA

FIG. 22 is a plot of cell voltage as a function of time for accelerated charge/discharge cycles (60 s/cycle) at + or -15 mA/cm² for the two most chemically stable self-doped polyaniline electrodes: PAN/TFMSA (FIG. 22A) and PAN/Ts (FIG. 22B). Both electrodes are prepared on the "fat-posts" three-dimensional electrode. The PAN/TFMSA shown no sign of degradation after about 600 cycles, while the PAN/Ts shown a slight degradation after about 500 cycles. This observation is consistent with the stability sequence listed above.

SELF-DISCHARGE TEST

In general, fast self-discharge is a serious problem in many polymeric electrodes. To identify the best self-doped polyaniline electrode, a self-discharge test is performed on the four polyaniline electrodes listed earlier. The open-circuit voltage ($V_{oc}$) is recorded of the cell (battery) comprising a self-doped polyaniline and a zinc sheet as anode as a function of time at constant temperature (25° C.) in 1M $ZnSO_4$ solution (pH 2.3) for up to about 20 hours. This method is time-consuming; but otherwise convenient because the results are insensitive to the coulombic capacity of the electrode, the quality of electric contacts in the system, and the conductivity of the electrolyte layer.

FIG. 23 shows $V_{oc}$ as a function of time for the four different polyaniline electrodes. This solution was kept purged with $N_2$ gas to avoid the influence of $O_2$. Each electrode is synthesized using approximately the same amount of coulombs (approximately 6 C). The surface morphology of the electrodes is shown in FIGS. 24 and 25. It is interesting to observed that the two most chemically stable electrodes identified in the previous experiment-PAN/Ts and PAN/TFMSA-also show a very stable open-circuit voltage after an initial slight drop of the voltage. In addition, these two electrodes exhibit a highly microporous morphology (although the PAN/TFMSA show some minor macrocracks), while other two electrodes (PAN/PVSA) and PAN/Bs) exhibit a compact, smooth surface. For a quantitative comparison, we have calculated the decrease in $V_{oc}$ at 60000 s (16.7 hours) for each electrode. Using this calculation, the self-discharge rate increases in the sequence:

PAN/TS ~ PAN/TFMSA << PAN/PVSA << PAN/Bs(w/Nf).

Table 12 summarizes the surface morphology, conductivity, basic battery performance, self-discharge rate, and stability (cyclability) of the four self-doped polyanilines made with different organic sulfonic acid dopants. Based on the results presented in Table 2 (in particular, the results of the accelerated stability test and the self-discharge test), polyaniline/trifluoromethanesulfonic acid [PAN/TFMSA] and polyaniline/toluenesulfonic acid (tosylate) [PAN/TS] are useful self-doped polyanilines for development TS] are useful self-doped polyanilines for development TS] are useful self-doped polyanilines for development TS] are useful self-doped polyanilines for development of a polymer battery, e.g. with a zinc anode.

All self-doped polyanilines exhibit a higher conductivity than the conventional PAN/$H_2SO_4$ films and also exhibit a permanently conductive region at potentials above 0.7 to 0.8 V vs. SCE. However, the surface morphology of the four self-doped polyanilines are quite different, and the PAN/Ts exhibits the best morphology. The PAN/TFMSA exhibits the best coulomb efficiency and may exhibit a high battery capacity after the polymerization conditions are optimized.

The observed almost featureless CV curves in aqueous solution with all of the four self-doped polyanilines strikingly resemble a typical CV curve for the conventional polyaniline electrode (e.g., made from 1M aniline in aqueous 2M $HClO_4$) measured in a nonaqueous solution (e.g., 1M $LiClO_4$/propylene carbonate). This resemblance supports the intrinsic superior stability of the self-doped polyanilines in aqueous solutions over the conventional polyanilines because the conventional polyanilines are known to be unstable in aqueous solutions but reasonably stable in nonaqueous solutions. Therefore, the development of an aqueous polymer battery based on the self-doped polyaniline is achieved.

TABLE 12

| BATTERY PERFORMANCE OF SELF-DOPED POLYANILINES | | | | |
|---|---|---|---|---|
| Characteristic | PAN/Toysylate (TS) | PAN/Trifluoro-methanesulfonate (TFSMA) | PAN/Polyvinyl-sulfonate (PVSA) | PAN/Benzene-sulfonate (Bs) |
| Morphology | Dense, | Slightly | Smooth, | Loose, |

TABLE 12-continued

BATTERY PERFORMANCE OF SELF-DOPED POLYANILINES

| Characteristic | | PAN/Toysylate (TS) | PAN/Trifluoro-methanesulfonate (TFSMA) | PAN/Polyvinyl-sulfonate (PVSA) | PAN/Benzene-sulfonate (Bs) |
|---|---|---|---|---|---|
| | | smooth durable | powdery | uniform | flaky, powdery |
| Resistance ($\Omega$) | | | | | |
| High* | | 60 | $\approx 100$ | 600 | 100 |
| Low | | $\approx 1$ | 2 | 30 | $\approx 1$ |
| Capacity (Ah/kg) | | 36 | 22 | 21 | 5 |
| Coulomb efficiency | (%) | 86 | 92 | 92 | 92 |
| Stability | | Excellent | Excellent | Poor | Poor |
| V (volts) | | 1.39 | 1.38 | 1.36 | 1.33 |
| $\Delta$V (volts) | | 0.09 | 0.09 | 0.26 | 0.47 |
| $\Delta$V/V (%) | | 6.4 | 6.5 | 19.0 | 34.9 |
| I (mA/cm$^2$) | | 16.3 | 16.8 | 12.6 | 1.5 |
| $\Delta$I (mA/cm$^2$) | | 1.0 | 0.4 | 6.8 | 0.65 |
| $\Delta$I/I** (%) | | 6.1 | 2.4 | 54.0 | 43.3 |

*Potential >0.7 V vs. SCE
 Potential 0 to 0.5 V vs. SCE
 At ±2 mA/cm$^2$
 V is open-circuit cell voltage of a battery (zinc sheet as anode; $\Delta$V is decrease in the cell voltage resulting from self-discharging after 16.7 hours
**I is current density at tenth cycle of half-cell when cycled in 1 M ZnSO$_4$ (pH 2.3) between +0.35 V and +0.8 V at a scan rate of 20 mV/s; $\Delta$I is the decrease in current density after 100 cycles The polyaniline/organic dopant combination is useful as a battery electrode, in electrochromic displays and similar electrical applications where electrical conductivity is important.

While only a few embodiments of the invention have been shown and described herein, it will become apparent to those skilled in the art that various modifications and changes can be made in the use of a permanently doped water-insoluble polyaniline for use as a battery electrode and the method of manufacture without departing from the spirit and scope of the present invention. All such modifications and changes coming within the scope of the appended claims are intended to be carried out thereby.

We claim:

1. A process of using an electrically conducting water-insoluble polymer, in a battery itself comprising an anode, a cathode and an electrolyte, said polymer having essentially permanent self-doping properties as compared to a physical combination of polyaniline and an organic dopant having at least one sulfonic acid group, which polymer consists essentially of:
   (a) an electrically polymerized polyaniline which is chemically bonded to
   (b) an organic dopant, said dopant having at least one sulfonic acid functional group, as a battery cathode with zinc as the anode and zinc sulfate as the electrolyte.

2. The process of using the polymer of claim 1 wherein the organic dopant is an aliphatic organic sulfonic acid.

3. The process of using the polymer of claim 2 wherein the organic dopant is a saturated aliphatic organic compound having from 1 to 20 carbon atoms.

4. The process of using the polymer of claim 1 wherein the organic-dopant is an aromatic organic sulfonic acid.

5. The process of using the polymer of claim 4 wherein the aromatic sulfonic acid is a benzene or substituted benzene sulfonic acid.

6. The process of using the electrically conducting polymer of claim 1 wherein the organic dopant is selected from benzenesulfonic acid, para-toluenesulfonic acid, benzenesulfonyl chloride, dodecylbenzenesulfonic acid, poly(vinylsulfonic) acid, methanesulfonic acid, trifluoromethanesulfonic acid, 1-butanesulfonic acid, modified NAFION$^R$, 2,3,5-trichlorobenzenesulfonic acid, vinylphenylsulfonic acid, or the alkali metal salts thereof.

7. The process of using the electrically conducting polymer of claim 6 wherein the organic dopant is para-toluenesulfonic acid.

8. The process of using the electrically conducting polymer of claim 6 wherein the organic dopant is trifluoromethanesulfonic acid.

* * * * *